United States Patent
Yokomakura et al.

(10) Patent No.: US 8,787,243 B2
(45) Date of Patent: Jul. 22, 2014

(54) WIRELESS COMMUNICATION SYSTEM, BASE STATION APPARATUS AND COMMUNICATION METHOD

(75) Inventors: Kazunari Yokomakura, Osaka (JP); Yasuhiro Hamaguchi, Osaka (JP); Hiroki Takahashi, Osaka (JP); Jungo Goto, Osaka (JP); Osamu Nakamura, Osaka (JP); Shinsuke Ibi, Suita (JP); Seiichi Sampei, Suita (JP); Shinichi Miyamoto, Suita (JP)

(73) Assignees: Sharp Kabushiki Kaisha, Osaka (JP); Osaka University, Osaka (JP)

( * ) Notice: Subject to any disclaimer, the term of this patent is extended or adjusted under 35 U.S.C. 154(b) by 66 days.

(21) Appl. No.: 13/393,055

(22) PCT Filed: Aug. 30, 2010

(86) PCT No.: PCT/JP2010/064737
§ 371 (c)(1), (2), (4) Date: Feb. 28, 2012

(87) PCT Pub. No.: WO2011/025008
PCT Pub. Date: Mar. 3, 2011

(65) Prior Publication Data
US 2012/0155373 A1    Jun. 21, 2012

(30) Foreign Application Priority Data
Aug. 31, 2009 (JP) ................. 2009-199227

(51) Int. Cl.
*H04B 7/14*    (2006.01)
*H04W 4/00*    (2009.01)

(52) U.S. Cl.
USPC ................ 370/315; 370/329; 370/341

(58) Field of Classification Search
CPC combination set(s) only.
See application file for complete search history.

(56) References Cited

U.S. PATENT DOCUMENTS

2008/0175183 A1    7/2008 Devroye et al.
2009/0196177 A1*   8/2009 Teyeb et al. ........... 370/231
(Continued)

FOREIGN PATENT DOCUMENTS

JP    2008-178070 A    7/2008
WO   WO 2008/136459 A1   11/2008

OTHER PUBLICATIONS

Chen et al., "Wireless Diversity through Network Coding," 2006 IEEE Wireless Communications and Networking Conference, Apr. 3, 2006, pp. 1681-1686.

(Continued)

*Primary Examiner* — Chi Pham
*Assistant Examiner* — Soon-Dong D Hyun
(74) *Attorney, Agent, or Firm* — Birch, Stewart, Kolasch & Birch, LLP

(57) ABSTRACT

A wireless communication system includes: a multiple number of mobile station apparatuses that transmit code bits obtained by applying error-correction coding to information bits; a relay station apparatus that receives code bits from the multiple mobile station apparatuses, applies network coding on the code bits and transmits the network-code bits; and a base station apparatus that receives and decodes the code bits and the network-code bits, wherein the base station apparatus, when decoding the received code bits, performs iteration decoding by regarding the received code bits as a serially concatenated code of network coding and error correction coding. Accordingly, decoding is performed by regarding the network code and the error correction code as a serial concatenated code, it is possible to obtain diversity with a simple configuration.

5 Claims, 20 Drawing Sheets

(56) References Cited

U.S. PATENT DOCUMENTS

| | | | |
|---|---|---|---|
| 2009/0252098 A1* | 10/2009 | Do et al. | 370/329 |
| 2010/0157878 A1* | 6/2010 | Zeitler et al. | 370/315 |
| 2010/0296459 A1 | 11/2010 | Miki et al. | |
| 2010/0316097 A1* | 12/2010 | Wang et al. | 375/211 |
| 2011/0085585 A1* | 4/2011 | Matsumoto et al. | 375/211 |
| 2011/0110284 A1* | 5/2011 | Wu et al. | 370/312 |

OTHER PUBLICATIONS

Hausl et al., "Joint Network-Channel Coding for the Multiple Access Relay Channel," In Proc. Intern. Workshop on Wireless Ad-hoc and Sensor Networks (IWWAN), 2006, pp. 1-6.

Zeitler et al., "On Quantizer Design for Soft Values in the Multiple-Access Relay Channel," IEEE International Conference on Communications ICC 2009 Proceedings, Jun. 14, 2009, pp. 1-5.

* cited by examiner

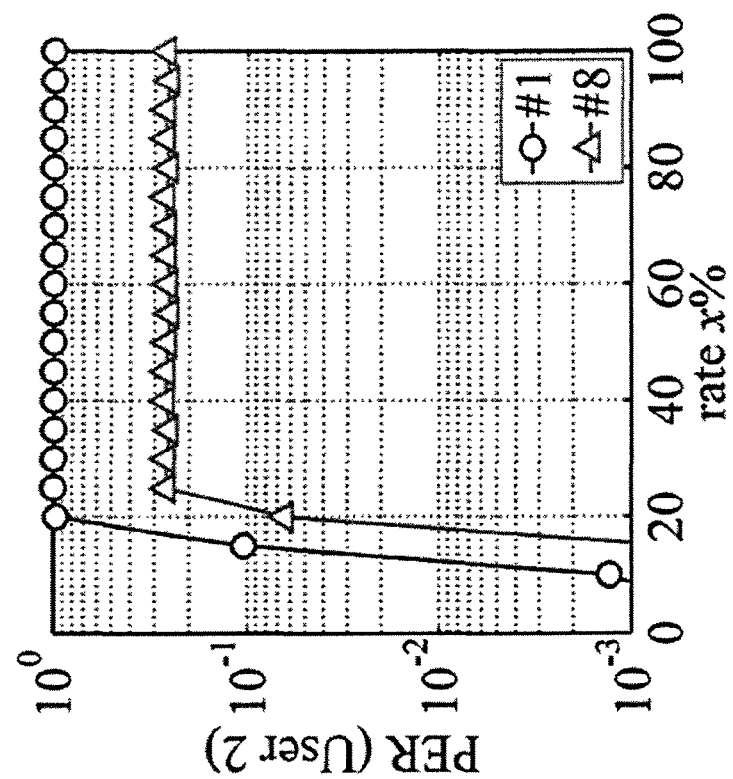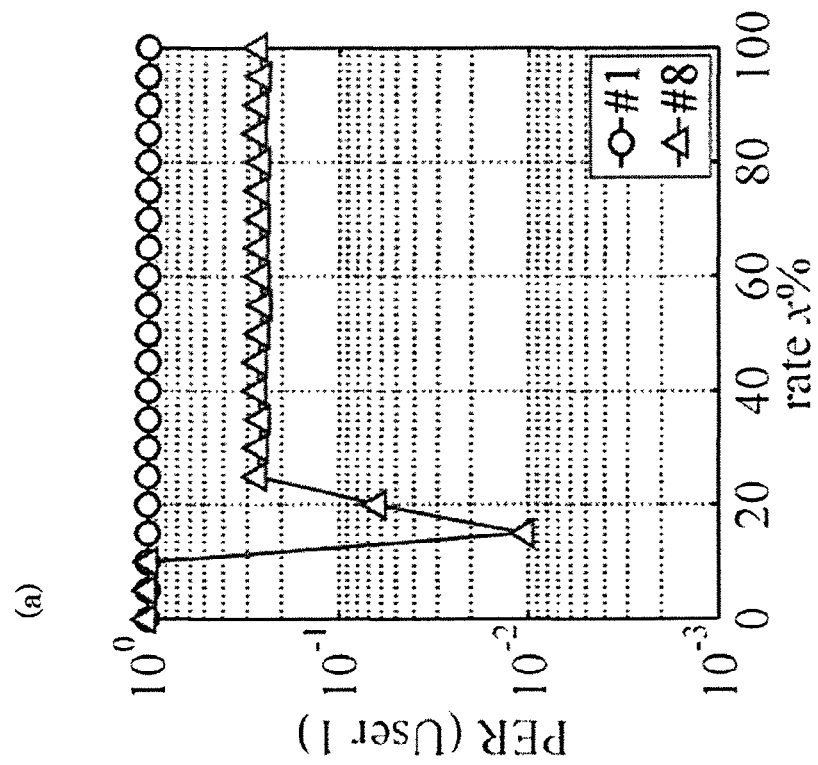
FIG. 8

US 8,787,243 B2

WIRELESS COMMUNICATION SYSTEM, BASE STATION APPARATUS AND COMMUNICATION METHOD

TECHNICAL FIELD

The present invention relates to a wireless communication system and the like.

BACKGROUND ART

Standardization of LTE (Long Term Evolution) system as the wireless communication system for 3.9-generation mobile phones has been almost completed, and recently, standardization of LTE-A (LTE-Advanced, or also called IMT-A or the like) as the 4-generation wireless communication system, which is the developed form of the LTE system, has been started.

It have been aggressively discussed in LTE-A system to eliminate dead zones where no base station can be installed and improve the received power level at the cell-edge, by deploying relay station apparatuses at arbitrary positions covered by base station apparatus.

In cases of the downlink (communication from a base station apparatus to a mobile station apparatus), a relay station apparatus may receive signals from the base station apparatus to individual mobile station apparatuses and amplify the received signals from the base station apparatus to relay the signals (L1 relay, or also called AF (Amplify-and-Forward) relay) or may decide the received signals once, re-code the obtained decoded bits and re-modulate the obtained coded bits to relay the signals (L2 relay or also called DF (Decode-And-Forward) relay). On the other hand, in cases of the uplink (communication from mobile station apparatuses to a base station apparatus), the relay station apparatus receives the signal from each mobile station apparatus and relays the signal to the base station apparatus by L1 relay, L2 relay or the like.

FIG. 16 shows one example of a mobile communication system using a relay station apparatus on the uplink. Description herein will be made on the assumption that the two mobile station apparatuses communicate with a base station apparatus by L2 relay. Further, it is also assumed that a first mobile station apparatus 1001 and a second mobile station apparatus 1002 perform data communication to a base station apparatus 1004 while a relay station apparatus 1003 is deployed between them.

First, first mobile station apparatus 1001 and second mobile station apparatus 1002 transmit transmission signals that are obtained by performing transmission processes such as coding and modulating on information bits, to base station apparatus 1004, using different radio resources (time, frequency, space) while base station apparatus 1004 receives the signals from the individual mobile station apparatuses. At the same time, relay station apparatus 1003 also receives the transmission signals transmitted by first mobile station apparatus 1001 and second mobile station apparatus 1002.

At relay station apparatus 1003, information bits are acquired from the received signal from each mobile station apparatus through reception processes such as equalization, demodulation, decoding and the like. The acquired decoded bits once again undergo transmission processes such as coding, modulation and the resultant signals are allotted to different radio resources for every mobile station, and transmitted to base station apparatus 1004.

In this way, deployment of the relay station apparatus enables the base station apparatus to receive the received signals via two routes, i.e., the wireless channel through which the signal from each mobile station apparatus directly reaches the base station apparatus and the wireless channel through which the signal reaches the base station apparatus from the relay station apparatus, hence it is possible to obtain not only diversity effect but also improve the quality of communication of mobile station apparatus at the cell-edge.

Further, non-patent document 1 for example demonstrates that when relay station apparatus 1003 relays signals from individual mobile station apparatuses, the relation station, instead of allocating different radio resources to the signals of individual mobile station apparatuses, performs network coding on the information bits of all the mobile station apparatuses by exclusive-ORing (XOR; Exclusive OR), and then transmits the resultant using a single radio resource. FIG. 17 shows the concept of this. Since the components allotted with the same reference numeral are the same as those in FIG. 16, their description is omitted.

In this figure, when the information bits transmitted from first mobile station apparatus 1001 are denoted by $b_1$ and the information bits transmitted from second mobile station apparatus 1002 are denoted by $b_2$, $b_1$ and $b_2$ are subjected to transmission processes such as error correction coding, modulation and the like, and then are transmitted as transmission signals, which are received by relay station apparatus 1003 and base station apparatus 1004. At relay station apparatus 1003, the received signals are subjected to reception processes such as demodulation, error correction decoding and the like so as to decode $b_1$ and $b_2$, respectively. When these signals are transmitted, the bits transmitted from individual mobile station apparatuses will not be transmitted by different radio resources, but the exclusive OR, $b_R$ between $b_1$ and $b_2$, represented by Ex. (1) is converted by transmission processing into a transmission signal, which in turn is transmitted.

[Math 1]

$$b_R = b_1 \oplus b_2 \qquad (1)$$

In Ex. (1), the symbol between $b_1$ and $b_2$ denotes the sign for exclusive OR operation; the operation produces 0 when two bits to be exclusive-ORed take the same value, and produces 1 when the two are different. Transmission of $b_R$ represented by Ex. (1) from the relay station apparatus makes it possible to reduce the radio resource corresponding to one transmission, hence can improve the relay efficiency and also can provide diversity effect thanks to relaying when appropriate signal processing is implanted on the base station apparatus side.

Non-patent document 2 demonstrates a specific configuration for gaining diversity from the received signal obtained by receiving the transmission signal that is generated by the thus operated relay station apparatus from the coded bits obtained by re-coding decoded bits once decoded, and the received signals having directly reached the base station apparatus from mobile station apparatuses. Description herein will be made when the number of mobile station apparatuses is 2. FIG. 18 shows one example of the mobile station apparatus.

In FIG. 18, a narrow-band single carrier that will not be affected by frequency selective fading is used for description simplicity. The mobile station apparatus includes a coding unit 1101, a modulating unit 1102, a D/A (Digital to Analog) unit 1103, a radio unit 1104 and a transmitting antenna 1105.

Information bits are error-correction coded by coding unit 1101, and modulating unit 1102 maps the information onto amplitude or phase in accordance with 0 and 1 of the input coded bits to thereby generate modulation symbols. The generated modulation symbols are converted by D/A unit 1103 from digital signals to analog signals, and the signal is up-converted to the radio frequency by radio unit 1104, and the resultant signal is transmitted from transmitting antenna 1105.

FIG. 19 shows one example of the relay station apparatus. In the relay station apparatus, the received signal, received by a receiving antenna 1111 is down-converted from the radio frequency to the baseband by a radio unit 1112, and the resultant signal is converted from analog signals to digital signals by an A/D (Analog to Digital) unit 1113.

Next, a radio resource separating unit 1114 separates the received signals into signals for individual mobile station apparatuses. The separated received signals for individual mobile station apparatuses are decomposed into bits from the modulation symbols of the individual mobile station apparatuses through demodulating units 1115-1 and 1115-2, and then are error-correction decoded by decoding units 1116-1 and 1116-2 to thereby produce estimates of information bits. The obtained information bits are rearranged in time order by interleaving units 1117-1 and 1117-2, then supplied to a changeover switch 1118. Herein, the process from demodulating unit 1115-1 to interleaving unit 1117-1 is the signal processing on the received signal reaching directly from first mobile station apparatus 1001 and the process from demodulating unit 1115-2 to interleaving unit 1117-2 is the signal processing on the received signal reaching directly from second mobile station apparatus 1002.

Changeover switch 1118 is designed to alternately switch every one bit, and the decoded bits of first mobile station apparatus 1001 and the decoded bits of second mobile station apparatus 1002 are input alternately to a coding unit 1119

In coding unit 1119, the alternately input decoded bits are error-correction coded once again by coding unit 1119, then the obtained coded bits are used by a modulating unit 1120 to generate modulation symbols. The modulation symbols are converted by a D/A unit 1121 into analog signals, which are up-converted by radio unit 1122 into the radio frequency and transmitted from transmitting antenna 1123.

In non-patent document 2, instead of using network coding by XORing, coding unit 1119 uses the original information bits and RSC (Recursive Systematic Convolutional) coding for transmitting parity bits obtained by sequentially and recursively convoluting information bits, as the network coding for a decoding process at the after mentioned receiving apparatus (base station apparatus). Here, in this specification, the coding at the relay station apparatus is called network coding. Further, the bit sequence output by network coding is called network coded bits, whereas the bit sequence output by error-correction coding is called coded bits.

FIG. 20 shows one example of the base station apparatus as the receiving apparatus. In base station apparatus 1004, the received signal is received by receiving antenna 1211, then down-converted from the radio frequency to the baseband by a radio unit 1212, then is converted into digital signals through an A/D unit 1213.

Thereafter, a radio resource separating unit 1214 separates the radio resources that have been used for communication by individual mobile station apparatuses and the radio resources that have been used for communication by relay station apparatus 1003. Here, since relay station apparatus 1003 receives the signal from each mobile station and transmits the signal after transmission processing, the signal is delayed by the time period of, at least, one transmission span. In this case, it is assumed that the received signal from each mobile station apparatus is buffered for the time period corresponding to the transmission span, to thereby realize transmission.

It is assumed in the following that the processing of the received signal from first mobile station apparatus 1001 is performed by a demodulating unit 1215-1 and decoding unit 1216-1, the processing of the received signal from second mobile station apparatus 1002 is performed by a demodulating unit 1215-2 and decoding unit 1216-2, and the processing of the received signal from relay station apparatus 1003 is performed by a demodulating unit 1215-R and decoding unit 1216-R.

The separated, received signals of individual mobile station apparatuses and relay station apparatus 1003 are input to demodulating units 1215-1, 1215-2 and 1215-R, respectively so that the received signal in modulation symbol units is decomposed into the received signal in bit units. It is noted that since log likelihood ratios (LLR) of the coded bits are often used as the received signal in bit units, LLRs will be used hereinbelow.

The obtained LLRs are input to decoding units 1216-1, 1216-2 and 1216-R and subjected to error correction. Next, the extrinsic LLRs of the information bits reformed by error correction at decoding unit 1216-1 are input interleaving unit 1218-1.

Similarly, the extrinsic LLRs of the information bits of second mobile station apparatus 1002, reformed by error correction at decoding unit 1216-2 are input interleaving unit 1218-2. In decoding unit 1216-R, the information bits transmitted from relay station apparatus 1003, consisting of the information bits of first mobile station apparatus 1001 and the information bits of second mobile station apparatus 1002, arranged alternately, are processed by error correction to calculate reformed extrinsic LLRs.

As to the extrinsic LLRs output from decoding unit 1216-R, those associated with the information bits of first mobile station apparatus 1001 are input to a deinterleaving unit 1217-1 and input to decoding unit 1216-1. Similarly, those associated with the information bits of second mobile station apparatus 1002 are input to a deinterleaving unit 1217-2 and input to decoding unit 1216-2.

The extrinsic LLRs of information bits output from interleaving units 1218-1 and 1218-2 and rearranged in time order are input alternately to decoding unit 1216-R, by the function of a changeover switch 1219. These extrinsic LLRs of information bits are used as channel information (extrinsic LLRs) for maximum a posteriori probability (MAP) estimation in decoding units 1216-1, 1216-2 and 1216-R.

This process is aimed at performing iterative decoding, by switching the parallel concatenated structure based on decoding unit 1216-1 and decoding unit 1216-R for the information bits of first mobile station apparatus 1001 and by switching the parallel concatenated structure based on decoding unit 1216-2 and decoding unit 1216-R for the information bits of second mobile station apparatus 1002. Taking into account that the information bits of relay station apparatus 1003 are formed of information bits of the individual mobile station apparatuses arranged alternately in decoding unit 1216-R, extrinsic LLRs of the information bits input from interleaving units 1218-1 and 1218-2 are changed over alternately by means of changeover switch 1219 and supplied to decoding unit 1216-R.

This process is repeated an arbitrary number of times to obtain decoded bits of each mobile station apparatus. In this way, diversity of the propagation paths through which the signals directly reach from individual mobile station apparatuses and the propagation path through which the signal reaches from relay station apparatus 1003, can be acquired by limiting the information bits by network coding and error correction coding.

PRIOR ART DOCUMENTS

Non-Patent Documents

Non-patent Document 1: Y. D. Chen, S. Kishore, and J. Li, "Wireless diversity through network coding," in Proc. IEEE WCNC' 06, vol. 3, pp. 1681-1686, 2006.

Non-patent Document 2: C. Hausl, and P. Dupraz, "Joint network-channel coding for the multiple-access relay channel," in Proc. IEEE SECON' 06, vol. 3, pp. 817-822, 2006.

SUMMARY OF THE INVENTION

Problems to be Solved by the Invention

However, non-patent document 1 only provides the concept and the theoretical proof of the capability of obtaining diversity effect, but does not include any disclosure of a specific receiver configuration for obtaining diversity.

With regard to non-patent document 2, since diversity gain thanks to relaying is acquired by switching the parallel concatenated structure, on the analogy of the parallel concatenated structure of the decoding structure in turbo coding, iterative change of information (the LLRs of information bits) is complicated, resultantly, posing the problem that the receiver configuration is intricate. Further, it is necessary to adopt a code formed of information bits with a parity bit such as a RSC code, hence there is a problem that flexibility in system design is low.

The present invention has been devised in view of the above circumstances, it is therefore an object of the invention to provide a wireless communication system and the like, which can obtain diversity with a simple configuration, by decoding as regarding the network code and error-correction code as serially concatenated codes and is free from limitation on the error-correction coding method, hence permits flexible system design.

Means for Solving the Problems

In view of the above problems, a wireless communication system of the present invention includes: a plurality of mobile station apparatuses that transmit coded bits obtained by applying error-correction coding to information bits; a relay station apparatus that receives coded bits from the plural mobile station apparatuses, applies network coding on the coded bits and transmits the network-coded bits; and a base station apparatus that receives and decodes the coded bits transmitted from the plural mobile station apparatuses and/or the network-coded bits transmitted by the relay station apparatus, characterized in that the base station apparatus, when decoding the received coded bits, performs iterative decoding by regarding the received coded bits as coded bits obtained by serially concatenated coding of the error correction coding and the network coding.

The wireless communication system of the present invention is characterized in that the network coding is realized by exclusive-OR operation in the relay station apparatus.

The wireless communication system of the present invention is characterized in that the relay station apparatus controls the ratio of coded bits to be multiplexed by network coding, in accordance with the reception power levels at which the signals from the mobile station apparatuses reach the base station apparatus.

The wireless communication system of the present invention is characterized in that the mobile station apparatus includes a plurality of transmitting antennas while the base station apparatus includes a plurality of receiving antennas, and network-coded bits are assigned to, at least, one of the transmitting antennas, and transmitted therefrom.

A base station apparatus of the present invention is a base station apparatus connected via a wireless communication system, to a plurality of mobile station apparatuses that transmit coded bits obtained by applying error-correction coding to information bits, and to a relay station apparatus that receives the coded bits from the plural mobile station apparatuses, applies network coding on the coded bits and transmits the network-coded bits, comprising: a decoding unit that receives and decodes the coded bits transmitted by the multiple mobile station apparatuses and the network coded bits transmitted by the relay station apparatus, and characterized in that the decoding unit, when decoding the received coded bits, performs iterative decoding by regarding the received coded bits as coded bits obtained by serially concatenated coding of the error correction coding and the network coding.

A communication method of the present invention is a communication method in a wireless communication system including: a plurality of mobile station apparatuses that transmit coded bits obtained by applying error-correction coding to information bits; a relay station apparatus that receives coded bits from the plural mobile station apparatuses, applies network coding on the coded bits and transmits the network-coded bits; and a base station apparatus the receives and decodes the coded bits transmitted from the multiple mobile station apparatuses and the network-coded bits transmitted by the relay station apparatus, characterized in that when decoding the received coded bits at the base station apparatus, iterative decoding is performed by regarding the received coded bits as coded bits obtained by serially concatenated coding of the error correction coding and the network coding.

Effect of the Invention

According to the present embodiment, decoding is performed by regarding the network code which the base station apparatus receives from the relay station apparatus and the error correction codes which the base station receives from mobile station apparatuses, as a serially concatenated code, whereby it is possible to obtain diversity with a simple configuration. Further, since no limitation is imposed on the error correction coding method, flexible system design is permitted.

Further, it is possible to provide a simpler base station apparatus (receiving apparatus) for obtaining diversity effect, by deploying a mobile station apparatus in a wireless communication system. Also, a flexible wireless communication system can be provided in system design.

BRIEF DESCRIPTION OF THE DRAWINGS

FIG. 8 A diagram for illustrating the packet error rate in the second embodiment.

MODES FOR CARRYING OUT THE INVENTION

Referring next to the drawings, modes for carrying out this invention will be described. The following embodiments will be given aiming at the uplink from which a receiving apparatus can detect all the signals collectively. However, application should not be limited to the uplink of mobile communication as long as the system can perform communication to a receiving apparatus capable of collective detection via a relay station apparatus. Further, though not illustrated hereinbelow, compensation for amplitude and phase variation due to radio channels in the narrow-band single carrier is applied before demodulation.

Moreover, though the following embodiments are aimed at narrow-band single carrier transmission, it goes without saying that the invention can be applied to any system as long as the system calculates LLRs of coded bits obtained by a decoding process since the essence of the present invention is to perform decoding by regarding the error correction code on the information bits of all the mobile station apparatuses and the network coding by XORing the obtained coded bits as the transmission bits that were transmitted by serially concatenated coding.

Also, since modulation is necessarily performed in a usual digital communication system, the invention is applicable to every possible transmission scheme. For example, it goes without saying that application can be made not only to orthogonal frequency multiplexing (OFDM: Orthogonal Frequency Division Multiplexing) schemes using multicarrier signals, wide-band single carrier transmission (SC-FDMA: Single Carrier Frequency Division Multiple Access, DFT-S-OFDM: Discrete Fourier Transform Spread-OFDM, Clustered DFT-S-OFDM and other transmission schemes) etc., but also to MIMO (Multiple-Input Multiple-Output) schemes and the like which exchange signals that are spatially and parallel separated.

Though the following embodiments are described referring to mobile communication systems, the invention can be applied to an indoor environment and a distributed autonomous network in which individual communication apparatuses form a wireless network without installation of any base station apparatus as long as multiple communication apparatuses transfer information to a specific communication apparatus also using a relay station apparatus.

1. The First Embodiment

To begin with, one example of a receiving apparatus included in a wireless communication system in the present embodiment will be shown as a first embodiment. The wireless communication system presumed in the present embodiment, similarly to the relay station apparatus shown in nonpatent document 1, applies network coding by XORing on the coded bits detected at the relay station apparatus, and will be described assuming that two mobile station apparatuses are connected to the base station apparatus.

Figure 1:
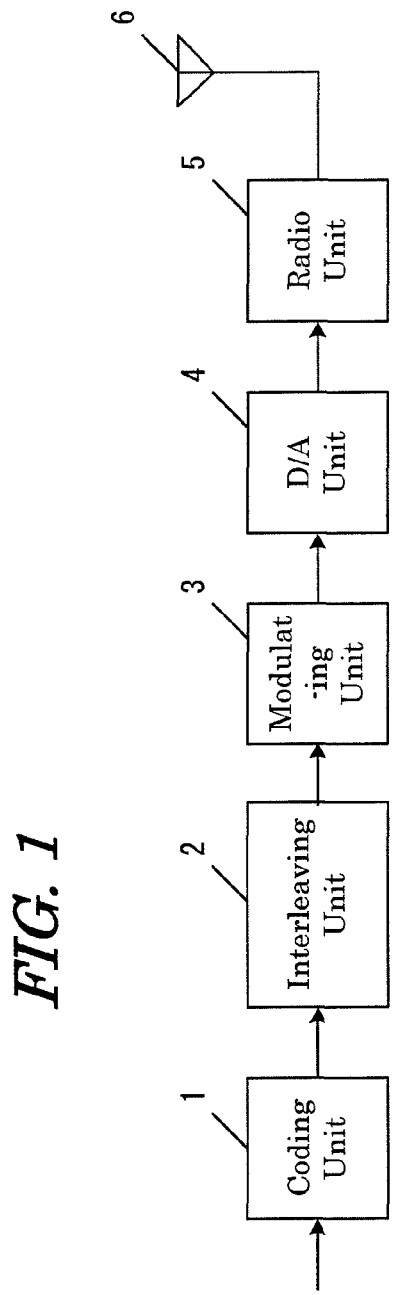
FIG. 1 A diagram showing a configuration of a mobile station apparatus in the first embodiment.

FIG. 1 shows one example of a mobile station apparatus. The mobile station apparatus includes a coding unit 1, an interleaving unit 2, a demodulating unit 3, a D/A unit 4, a radio unit 5 and a transmitting antenna 6. The mobile station apparatus performs error-correction coding on information bits by means of coding unit 1 and shuffles time sequence of the obtained coded bits by interleaving unit 2 in order to reduce correlation between coded bits. The coded bits output from interleaving unit 2 is input to demodulating unit 3, where modulation symbols are generated. The generated modulation symbols are input to D/A unit 4, where they are converted into analog signals, which are up-converted to the radio frequency by radio unit 5 and transmitted from transmitting antenna 6.

Figure 2:
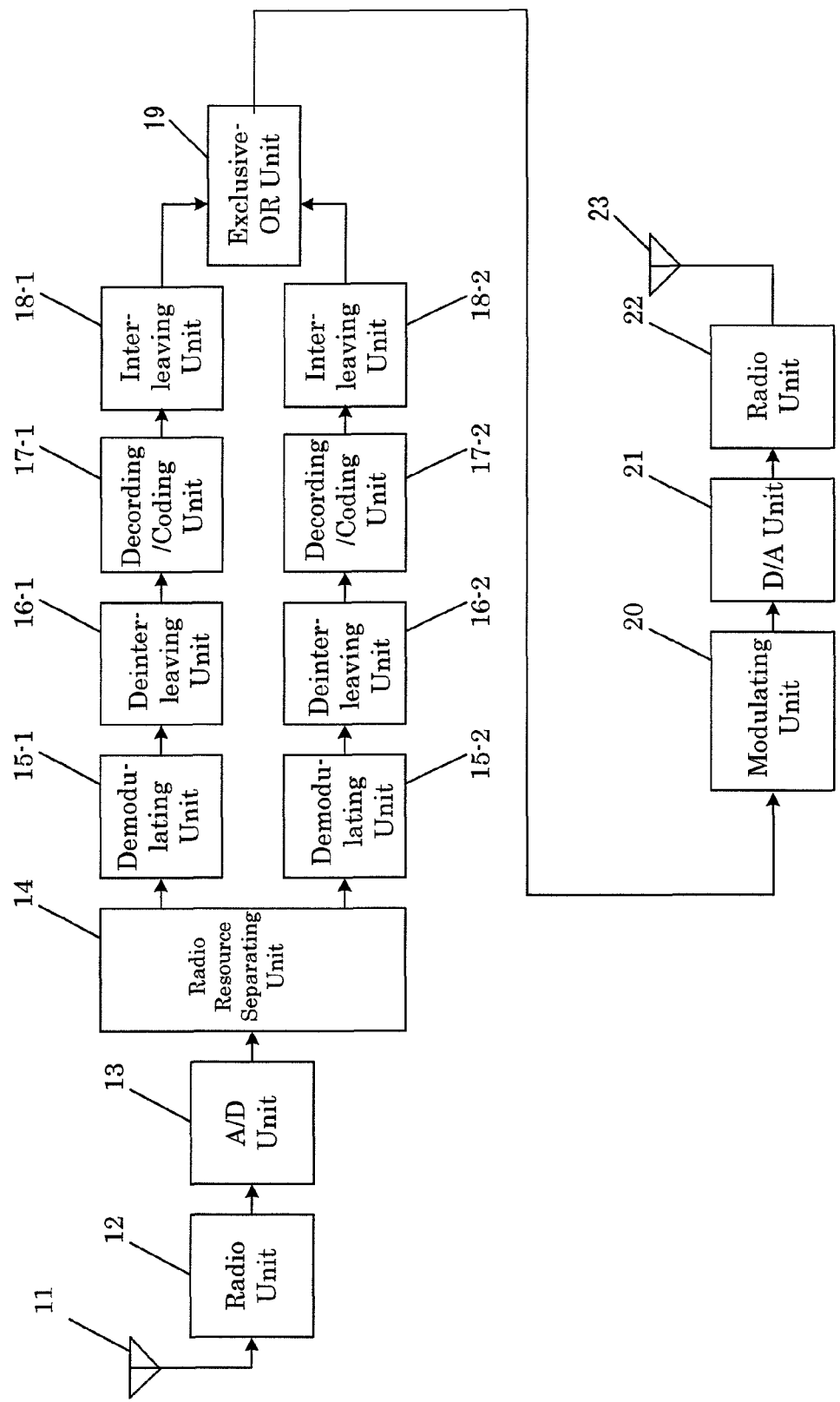
FIG. 2 A diagram showing a configuration of a relay station apparatus in the first embodiment.

Next, FIG. 2 shows one example of a relay station apparatus. The relay station apparatus includes a receiving antenna 11, a radio unit 12, an A/D unit 13, a radio resource separating unit 14, demodulating units 15-1 and 15-2, deinterleaving units 16-1 and 16-2, decoding/coding units 17-1 and 17-2, interleaving units 18-1 and 18-2, an exclusive-OR unit 19, a modulating unit 20, a D/A unit 21, a radio unit 22 and a transmitting antenna 23.

The received signals reaching from all the mobile station apparatuses are received by receiving antenna 11, then are down-converted to the baseband by radio unit 12, and converted into digital signals by means of A/D unit 13. Thereafter, radio resource separating unit 14 separates the signals for every mobile station apparatus, and demodulating units 15-1 and 15-2 calculate extrinsic LLRs of the coded bits from the received modulation symbols, respectively. The obtained extrinsic LLRs are input to deinterleaving units 16-1 and 16-2 in order to recover the original time sequence, and input to decoding units 17-1 and 17-2.

Decoding units 17-1 and 17-2 re-code the information bits transmitted from respective mobile station apparatuses by error correction processing and output the coded bits. The obtained coded bits are rearranged once again so that the time sequence becomes equal to that of the coded bits transmitted from each mobile station apparatus, and the rearranged coded bits are XORed by exclusive-OR unit 19 to generate network coded bits. Thereafter, the result is supplied to modulating unit 20 so that modulation symbols are generated. Then, the symbols are converted into analog signals by means of D/A unit 21 and up-converted to the radio frequency by radio unit 22, and transmitted from transmitting antenna 23.

Though, in the present embodiment, coded bits are obtained by error-correction decoding in decoding/coding units 17-1 and 17-2, coded bits may be obtained by performing hard decisions on the LLRs of the coded bits obtained by demodulating units 15-1 and 15-2, or by interleaving the coded bits, which have been obtained by re-coding the decoded bits obtained by decoding of information bits of each mobile station apparatus by decoding units 17-1 and 17-2, if the reception power level at the relay station is high enough. In other words, since it is essentially identical if exclusive-OR of coded bits can be calculated in the same order of the coded bits each mobile station apparatus transmitted, any method can be used as long as the calculation can be realized. Further, the above mention merely means that the higher efficiency can be obtained if the reception power level at the relay station is sufficient. However, since the method can be essentially applied even if the reception power is not high enough, the application should not be limited only to the case where reception power is sufficiently high.

Figure 3:
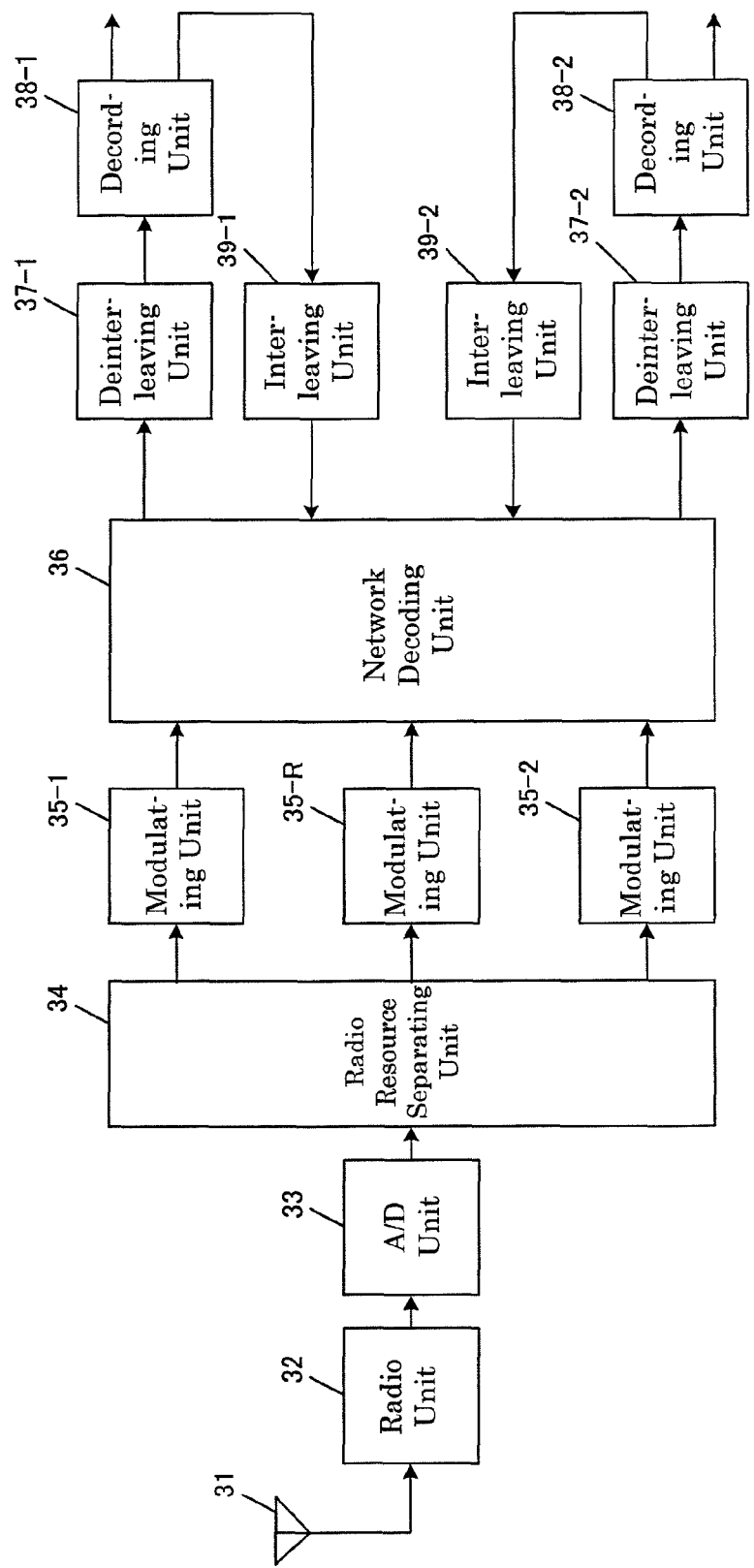
FIG. 3 A diagram showing a configuration of a base station apparatus in the first embodiment.

Subsequently, FIG. 3 shows one example of a receiving apparatus (base station apparatus). The receiving apparatus includes a receiving antenna 31, a radio unit 32, an A/D unit 33, a radio resource separating unit 34, demodulating units 35-1, 35-2 and 35-R, a network decoding unit 36, deinterleaving units 37-1 and 37-2, channel decoding/coding units 38-1 and 38-2 and interleaving units 39-1 and 39-2.

Here, as shown in the same figure, network decoding unit 36 is connected in series with decoding units 38-1 and 38-2. Since the coded bits obtained by error-correction coding by mobile station apparatuses are network-coded again by XORing at the relay station apparatus and transmitted as network-coded bits, this means that on the receiver side, the entire coding unit is regarded as a serial concatenated system (serial concatenation) of the error-correction coding units of the mobile station apparatuses and the exclusive-OR unit in the relay station apparatus.

The received signal received by receiving antenna 31 is down-converted to the baseband by radio unit 32, and then is converted into digital signal by A/D unit 33. Thereafter, the signals are separated by radio resource separating unit 34 into signals of individual mobile station apparatuses and the signal of the relay station apparatus, which are processed by demodulating units 35-1, 35-2 and 35-R, respectively, to obtain extrinsic LLRs of the coded bits transmitted from the first mobile station apparatus and second mobile station apparatus and the relay station apparatus.

Next, the extrinsic LLRs of the coded bits received from each mobile station apparatus and the network coded bits received from the relay station apparatus are input to network decoding unit 36, where MAP estimation is performed as a network code having a coding rate of ⅔ by regarding the extrinsic LLR of the network coded bits as the parity bit, to thereby obtain extrinsic LLRs of the coded bits of each mobile station apparatus.

The obtained extrinsic LLRs of the coded bits of individual mobile station apparatus are recovered to the original in the time order by deinterleaving units 37-1 and 37-2 and supplied to decoding units 38-1 and 38-2, respectively. In decoding units 38-1 and 38-2, error-correction decoding based on MAP estimation is implemented so that extrinsic LLRs of improved coded bits. The result is rearranged in the time order by interleaving units 39-1 and 39-2, and input network decoding unit 36 as the apriori information so as to obtain further improved extrinsic LLRs of the coded bits of each mobile station apparatus. These are once again input to decoding units 38-1 and 38-2. This process is repeated an arbitrary number of times, and finally the decoded bits output from decoding units 38-1 and 38-2 are obtained.

In the above way, according to the present embodiment, by regarding the extrinsic LLRs obtained by a decoding process from the received signals as the transmission bits obtained by the coding resulting from direct concatenation of the error-correction coding on the information bits in all the mobile station apparatuses and the network coding by the relay station apparatus on the coded bits of the all mobile station apparatuses, MAP estimation of the network coded bits and MAP estimation of the coded bits are serially processed to exchange extrinsic LLRs of coded bits, whereby it is possible with a simple receiving configuration to acquire diversity gain as a result of relaying.

Figure 4:
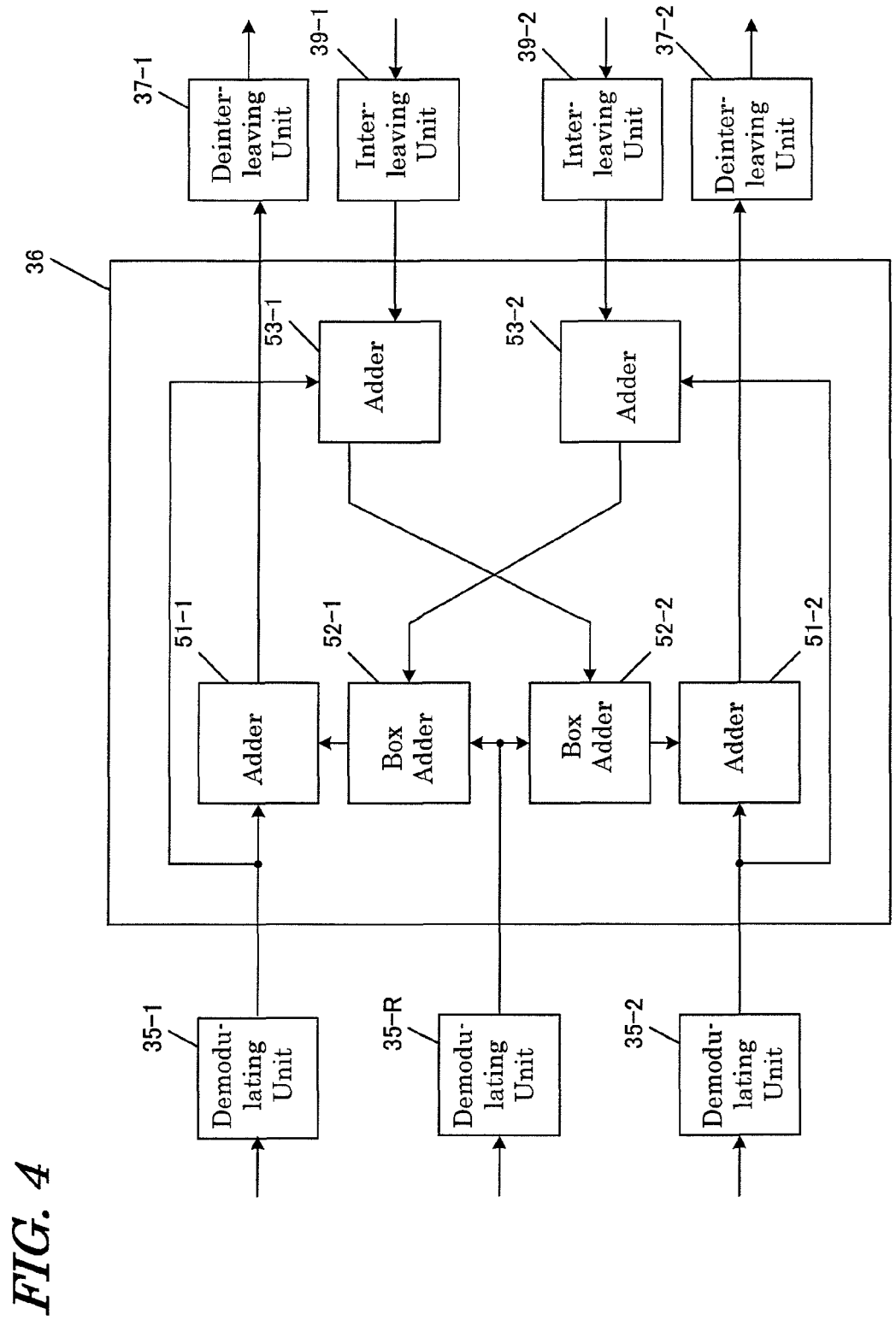
FIG. 4 A diagram showing a configuration of a network decoding unit in the first embodiment.

FIG. 4 shows a configuration of network decoding unit 36. Network decoding unit 36 includes adders 51-1, 51-2, 53-1 and 53-2 and box adders 52-1 and 52-2. The extrinsic LLRs obtained from the received signals of the first and second mobile station apparatuses, input from decoding units 35-1 and 35-2 and the extrinsic LLRs input from interleaving units 39-1 and 39-2 are added at adders 53-1 and 53-2, and the added results are input to box adders 52-2 and 52-1, respectively. When the two signals input to the box adder are denoted by A and B, the box addition is an operation defined by Ex. (2).

[Math 2]

$$A \boxplus B = \ln \frac{e^A + e^B}{1 + e^{A+B}} \approx (-1) \cdot \mathrm{sign}[A] \cdot \mathrm{sign}[B] \cdot \min(|A|, |B|) \quad (2)$$

In Ex. (2), e is Napier's constant, and ln is the natural logarithm, which having e as its base; sign [A] represents the sign of A, taking a value of 1 if A is positive and a value of −1 if A is negative; and min (x,y) is an operator that takes the minimum value of x and y.

In box adders 52-1 and 52-2, box addition of the extrinsic LLRs input from demodulating unit 35-R and the signal input from adder 53-2 or 53-1 is calculated by Eq. (2), and at adder 51-1 and 51-2 the result is added to the extrinsic LLRs input from demodulating unit 35-1 or 35-2.

Then, the signals after addition are output to deinterleaving units 37-1 and 37-2. In sum, when the extrinsic LLRs input from demodulating units 35-1, 35-2 and 35-R are denoted as $\alpha_1, \alpha_2, \alpha_R$, and the extrinsic LLRs as the apriori information, input from interleaving units 39-1 and 39-2 are denoted as $\gamma_1$ and $\gamma_2$, output extrinsic LLRs $\beta_1$ and $\beta_2$ output to deinterleaving units 37-1 and 37-2 are given by Ex. (3) and Ex. (4), respectively.

[Math 3]

$$\beta_1 = \alpha_1 \boxplus (\alpha_R + (\gamma_2 + \alpha_2)) \quad (3)$$

$$\beta_2 = \alpha_2 \boxplus (\alpha_R + (\gamma_1 + \alpha_1)) \quad (4)$$

In the above way, according to the present embodiment, by regarding the combination of the network code obtained by XORing and the received signals directly transmitted from individual mobile station apparatuses, as a code of a coding rate of ⅔, and serially concatenating the code with error correction decoding, it is possible to simplify the receiver configuration and make the operation cooperative by iterative processing, hence acquire diversity effect owing to the relay station.

2. The Second Embodiment

Next, the second embodiment will be described. The second embodiment presents a case where when there is imbalance in the reception quality at the base station apparatus between the transmitted signals from individual mobile station apparatuses, the relay station apparatus, limiting the number of coded bits to be XORed, transmits the original coded bits of the mobile station apparatus whose reception power at the base station apparatus is low, as the remaining transmissible coded bits.

Usually, in a communication via a relay station apparatus, the reception power level between a mobile station apparatus and a base station apparatus is higher than the reception power level between the relay station apparatus and the base station apparatus. Further, the reception power levels become different between mobile station apparatuses, depending on their relative positions. The present embodiment provides a method for improving the performance in this case.

Figure 5:
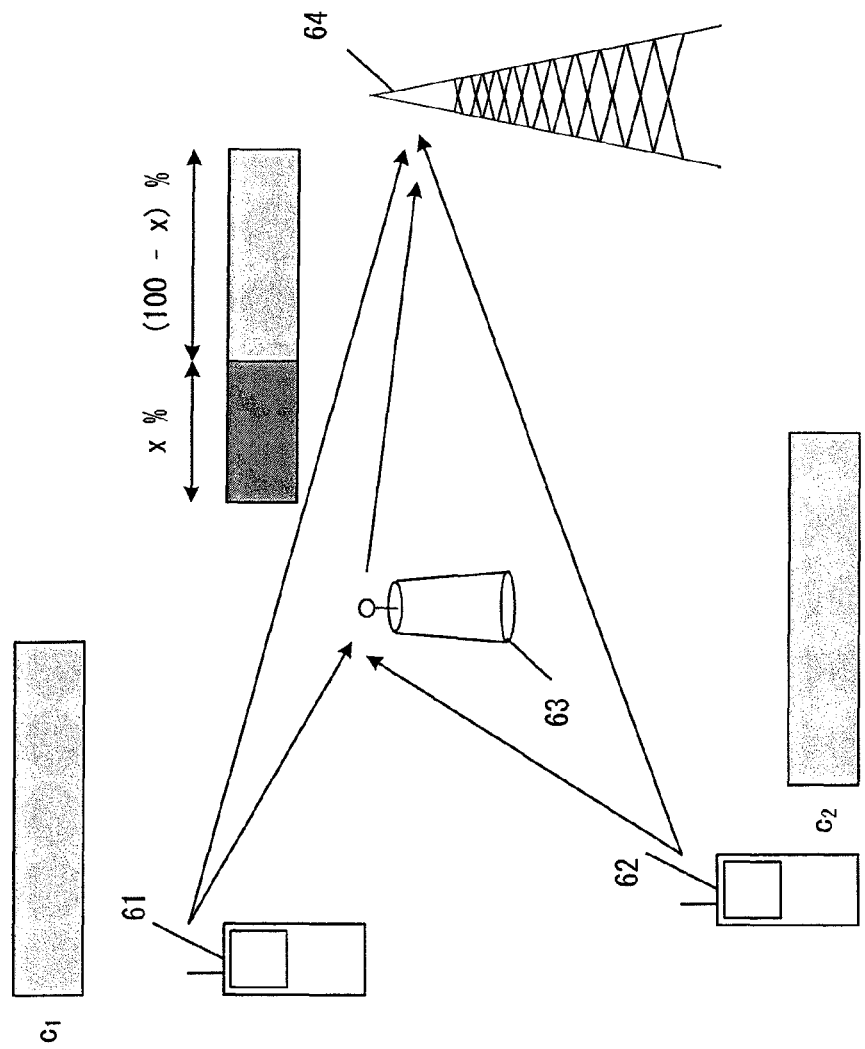
FIG. 5 A diagram showing the outline of a wireless communication system in the second embodiment.

FIG. 5 shows the concept for it. The decoding method of the base station apparatus is assumed to be the same as that in the first embodiment. The coded bit transmitted by a first mobile station apparatus 61 is dented by $c_1$ and the coded bit transmitted by a second mobile station apparatus 62 is dented by $c_2$. Considered herein will be a case where the channel gain between first mobile station apparatus 61 and base station apparatus 64 is higher than the gain between second mobile station apparatus 62 and base station apparatus 64.

In the present embodiment, despite that a cooperative decoding process is performed at the base station apparatus 64, using the network coded bits which were transmitted from relay station apparatus 63, and multiplexed as parity bits for coded bits of each mobile station apparatus by exclusive-OR operation, the packet error rates after the first iteration loop become different between mobile station apparatuses when there is imbalance in reception power.

In this case, the cooperative decoding makes the packet error rates cooperatively converge to roughly equivalent values if iteration can produce proper convergence. However, this will not always maximize the coding gain obtained by the iteration process.

To deal with, the ratio of the coded bits to be network-coded at relay station apparatus 63 by exclusive-ORing is controlled so that the packet error rates after the first iteration loop will become balanced. In FIG. 5, when relaying the coded bits from first mobile station apparatus 61 and second mobile station apparatus 62, relay station apparatus 63 network-codes only x % of the coded bits of first mobile station apparatus 61, which are high in reception power, by exclusive-ORing with the coded bits of second mobile station apparatus 62 and transmits the original coded bits of second mobile station apparatus 62, which are low in reception power, using the remaining (100-x) %.

Of the network coded bits transmitted by relay station apparatus 63, $c_1$ and $c_2$ are exclusive-ORed and transmitted in the first x % of coded bits, then in the remaining (100-x) % only $c_2$ is transmitted without $c_1$ multiplexed. By making such control that the first packet error rates can be balanced by iteration with this ratio x, it is possible to enlarge the iteration gain, in consideration of reception power imbalance, hence further improve transmission characteristics.

Next, one exemplary method of setting this x will be shown. The value of x is determined depending on the combination of the reception quality (e.g., reception SNR (Signal to Noise power Ratio)) between first relay station apparatus 61 and base station apparatus 64, the reception quality between second mobile station apparatus 62 and base station apparatus 64 and the reception quality between relay station apparatus 63 and base station apparatus 64.

Therefore, combination of these three and x is optimized beforehand by computer simulation or the like so that the optimized result is stored beforehand as a LUT (Look Up Table) in the base station. Then, the base station measures the reception qualities from each mobile station apparatus and the relay station apparatus, selects a suitable x and the mobile station apparatus of which the reception power is high, and notifies the selected result to the relay station apparatus.

Figure 6:
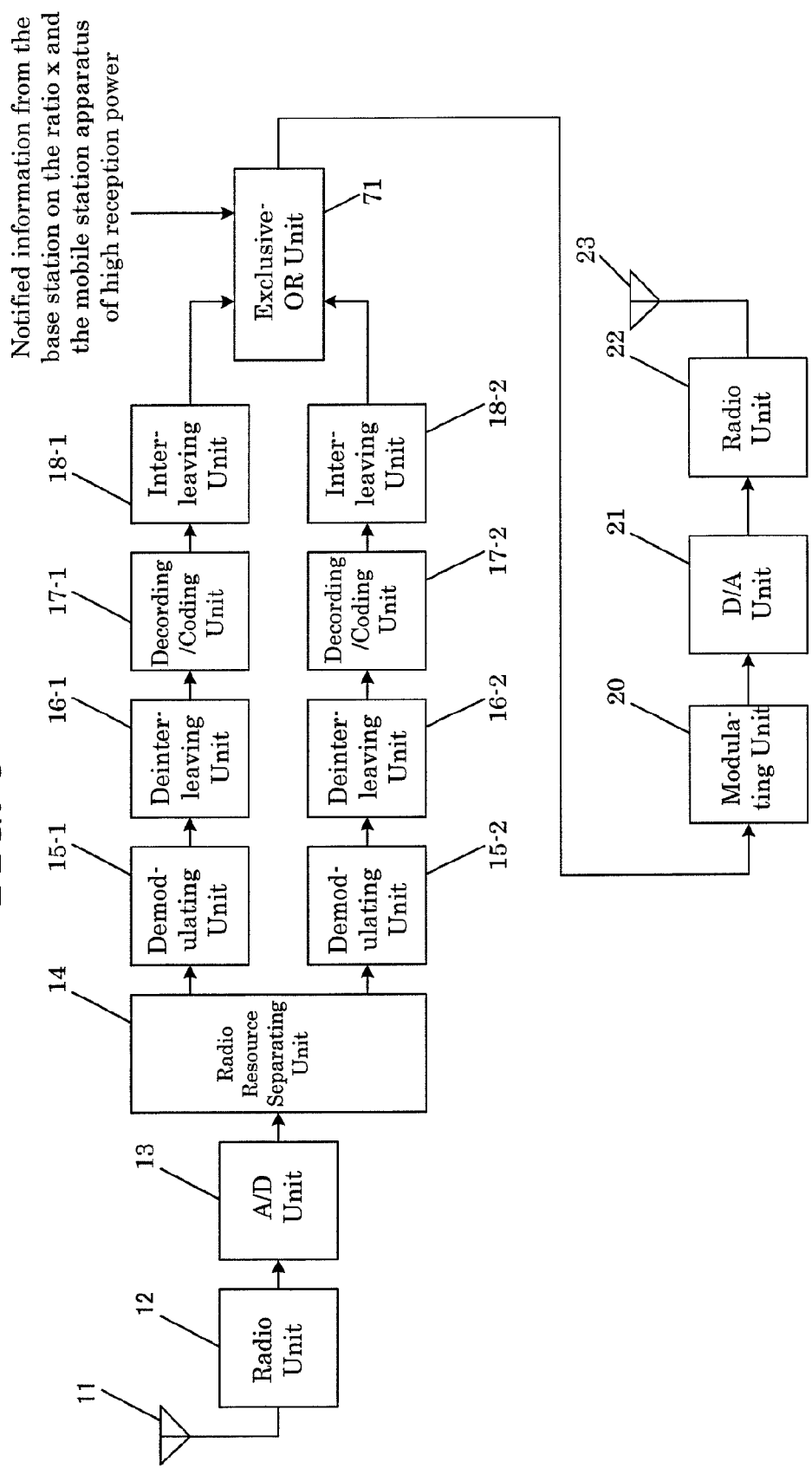
FIG. 6 A diagram showing a configuration of a relay station apparatus in the second embodiment.

FIG. 6 shows one example of a relay station apparatus for controlling the ratio of coded bits to be multiplexed. In this figure, the blocks allotted with the same reference numerals as that in FIG. 2 have the same functions as that in FIG. 2. The difference resides in an exclusive-OR unit 71.

Exclusive-OR unit 71 receives input of not only the coded bits of individual mobile station apparatuses from inter leavers 18-1 and 18-2 but also the value x of the aforementioned, detected ratio of the bits to be network-coded and the information on which mobile station apparatus is higher in reception power, and performs network coding by x % of the coded bits of all the mobile station apparatuses and outputs the original coded bits of the mobile station apparatus whose reception power is low, by use of the remaining (100-x) %. In this way, it is possible to optimize the gain by iteration, by limiting the ratio of coded bits to be multiplexed using network coding, to x %.

Here, network coding by XORing is adopted on the premise that only x % of the coded bits of the mobile station apparatus of which reception power is high is transmitted while the original of the coded bits of lower reception power is transmitted as the remaining bits. However, since it is possible to perform an equivalent process by replacing (100-x) % of the coded bits of the mobile station apparatus of which the reception power is high, with 0s, this method can also be used.

Figure 7:
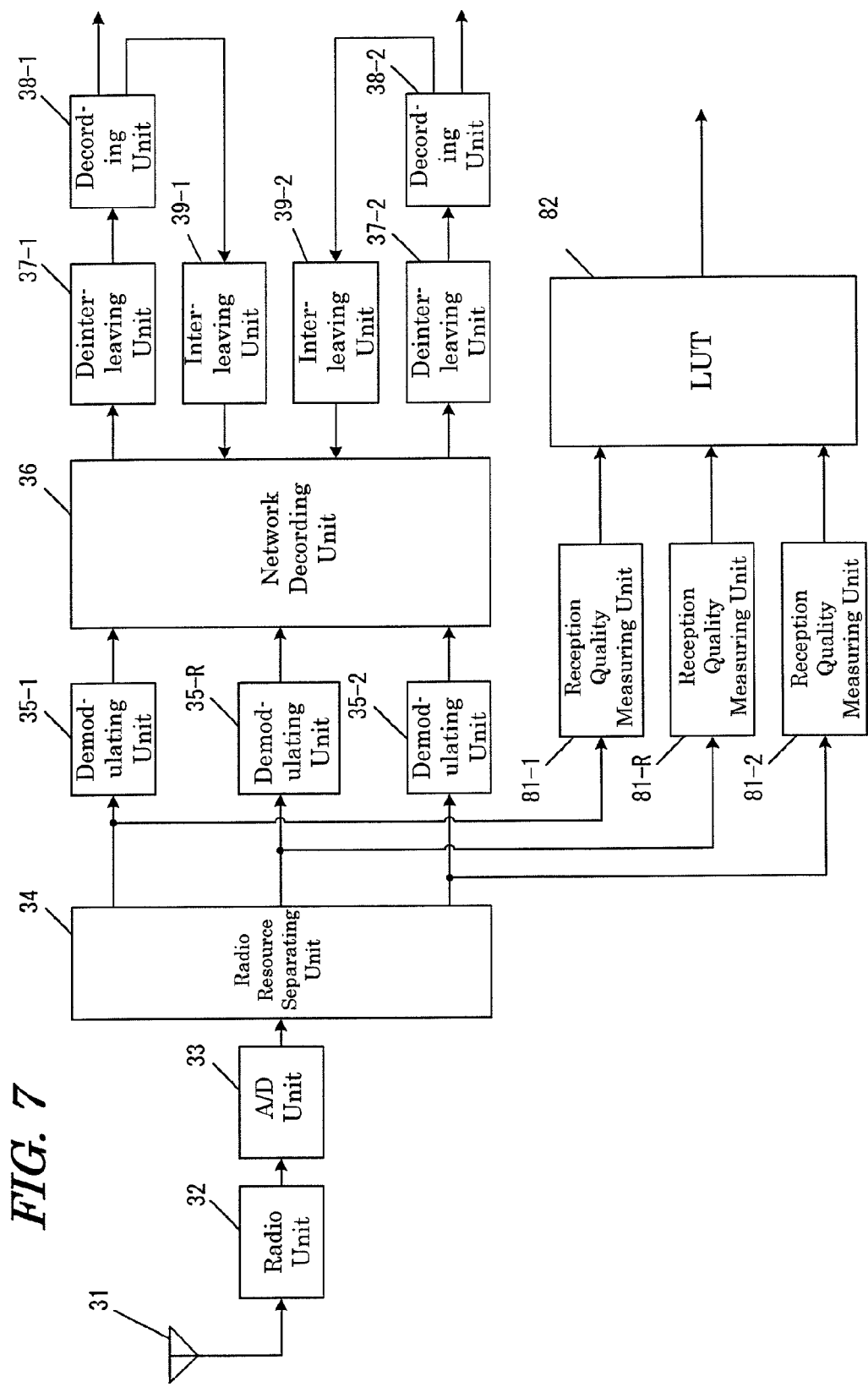
FIG. 7 A diagram showing a configuration of a base station apparatus in the second embodiment.

FIG. 7 shows one example of a base station apparatus. In this figure, the basic configuration is the same as that in FIG. 3. The functions of blocks allotted with the sample reference numerals as in FIG. 3 are the same so that description is omitted. In the figure, reception quality measuring units 81-1, 81-2 and 81-R measure reception qualities, and based on the reception qualities a LUT 82 calculates the ratio, x % for exclusive-ORing and notifies the relay station apparatus of the ratio together with the information on the mobile station apparatus which is high in reception power.

FIG. 8 shows packet error rate characteristics of each mobile station apparatus when the ratio x of signal multiplexing is varied under the condition that the reception SNR of the channel from the relay station apparatus to the base station apparatus is 3 dB, the reception SNR of the channel from the first mobile station apparatus to the base station apparatus is −2 dB and the reception SNR of the channel from the second mobile station apparatus to the base station apparatus is −3 dB. FIG. 8(*a*) shows the packet error rate of the first mobile station apparatus and FIG. 8(*b*) shows the packet error rate of the second mobile station apparatus.

Herein, it is assumed that the packet size is 2048 bits, QPSK turbo coding with a coding rate of ½ is used as the modulation scheme while AWGN (Additive White Gaussian Noise) channel and random interleaving are assumed. It is also assumed that the number of interaction of turbo coding in the decoding unit is 4, and the number of iteration at the network decoding unit and the decoding unit are 1 and 8, respectively.

Here, the relay station apparatus varies the ratio of the coded bits transmitted from each mobile station apparatus, with the coded bits of the first mobile station apparatus are which multiplexed by network coding. As shown in the same chart, the packet error rate does not become minimum when all the coded bits of the first mobile station apparatus is network-coded with the cod bits of the second mobile station apparatus, i.e., at the time of 100%, but becomes minimum at the time of 15%. It is understood that the most efficient transmission performance is obtained when the relay station apparatus uses only 15% of the coded bits of the first mobile station apparatus for network-coding with the coded bits of the second mobile station apparatus.

3. The Third Embodiment

Figure 9:
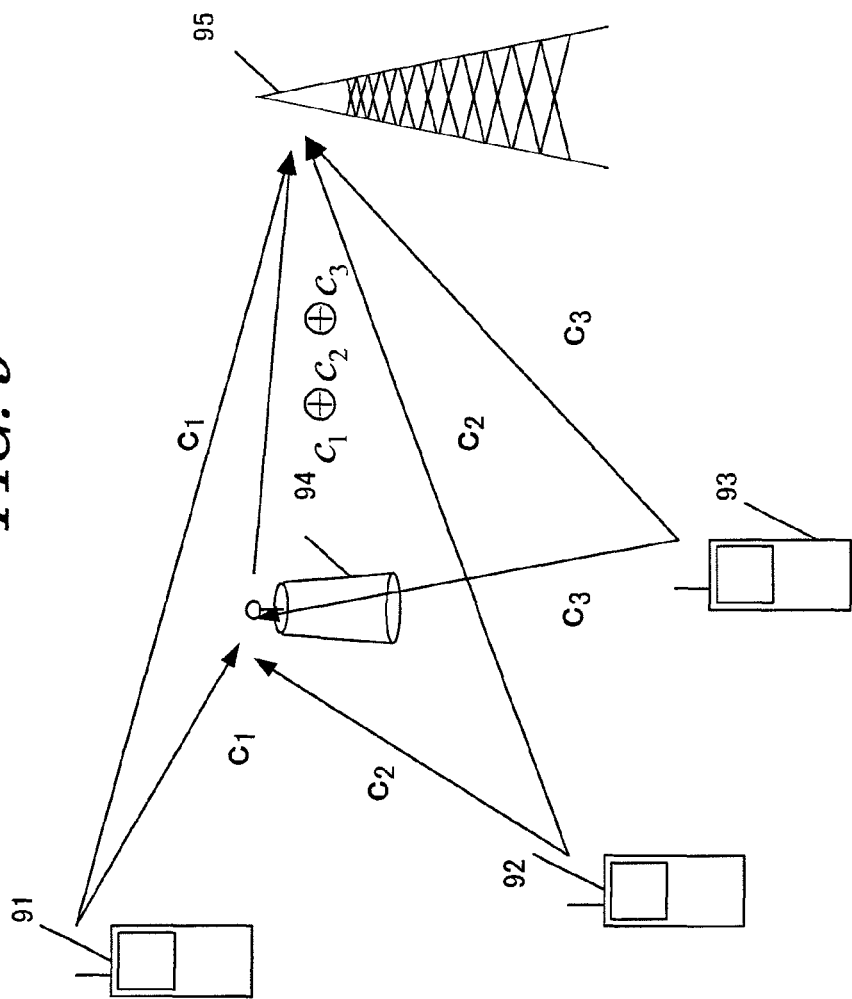
FIG. 9 A diagram showing the outline of a wireless communication system in the third embodiment.

Next, the third embodiment will be explained. FIG. 9 shows a conceptual diagram of the third embodiment where three mobile station apparatuses exist with one relay station apparatus. Herein, mobile station apparatuses 91, 92 and 93 transmit bits $c_1$, $c_2$ and $c_3$, respectively, and a relay station apparatus 94 transmits exclusive-OR $C_R$ of these three base station apparatuses ($c_1$, $c_2$, $c_3$) to a base station apparatus 95. In this case, in the present embodiment, information bits are detected by a serial concatenated structure of the network code having a coding rate of ¾ with the transmission bit obtained by exclusive-ORing as the parity bit and error correction codes.

Figure 10:
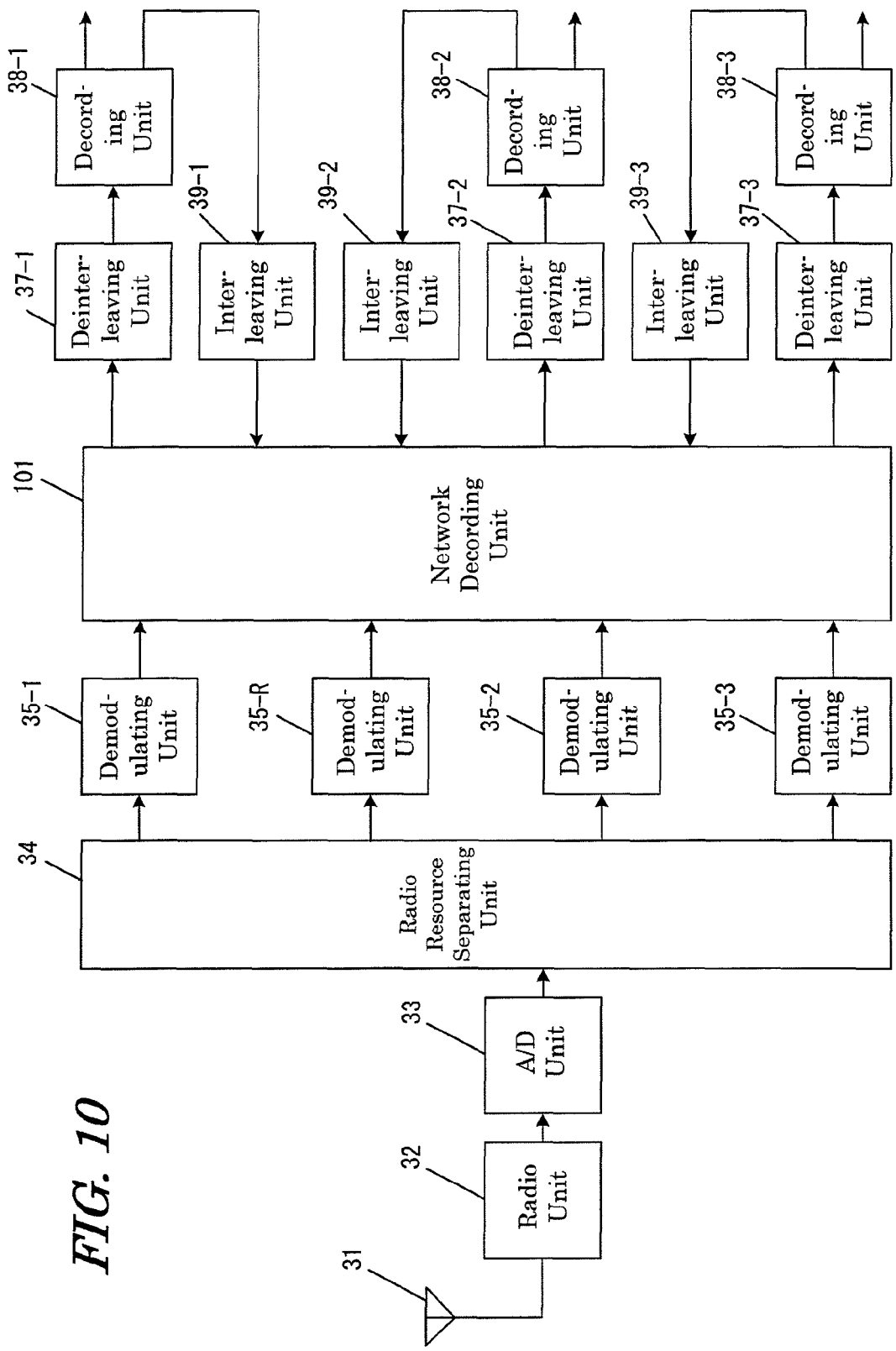
FIG. 10 A diagram showing a configuration of a base station apparatus in the third embodiment.

FIG. 10 shows one example of a base station apparatus. The basic configuration in this figure is the same as that of FIG. 3. The blocks designated by the same reference numerals are the same as in the configuration of FIG. 3. Further, in the present embodiment, three mobile station apparatuses perform cooperative communication, so that a decoding unit 35-3, deinterleaving unit 37-3, decoding unit 38-3 and interleaving unit 39-3 are added. This is to detect the third mobile station apparatus.

The distinctive point of the present embodiment resides in a network decoding unit 101. First, in network decoding unit 101, the apriori LLRs (extrinsic LLRs output from the decoding units and rearranged in time order) are denoted as $\gamma_1$, $\gamma_2$ and $\gamma_3$, input from interleaving units 39-1, 39-2 and 39-3 and extrinsic LLRs input from demodulating units 35-1, 35-2, 35-3 and 35-R are denoted as $\alpha_1$, $\alpha_2$, $\alpha_3$ and $\alpha_R$.

These LLRs are converted to the probabilities of the coded bits being 0 and 1, and the marginal probabilities of $c_1$, $c_2$ and $c_3$ are determined based on the combined probabilities of all the states the network code take and the apriori LLRs as $\gamma_1$, $\gamma_2$ and $\gamma_3$, the feedback from the decoding units, whereby the output extrinsic LLRs after network decoding of each mobile station apparatus are given by Exs. (5) to (7).

[Math 4]

$$\beta_1 = \alpha_1 + \ln \frac{e^{\alpha_R} + e^{\alpha_2+\gamma_2} + e^{\alpha_3+\gamma_3} + e^{\alpha_2+\alpha_3+\alpha_R+\gamma_2+\gamma_3}}{1 + e^{\alpha_2+\alpha_R+\gamma_2} + e^{\alpha_3+\alpha_R+\gamma_3} + e^{\alpha_2+\alpha_3+\gamma_2+\gamma_3}} \quad (5)$$

$$\beta_2 = \alpha_2 + \ln \frac{e^{\alpha_R} + e^{\alpha_1+\gamma_1} + e^{\alpha_3+\gamma_3} + e^{\alpha_1+\alpha_3+\alpha_R+\gamma_1+\gamma_3}}{1 + e^{\alpha_1+\alpha_R+\gamma_1} + e^{\alpha_3+\alpha_R+\gamma_3} + e^{\alpha_1+\alpha_3+\gamma_1+\gamma_3}} \quad (6)$$

$$\beta_3 = \alpha_3 + \ln \frac{e^{\alpha_R} + e^{\alpha_1+\gamma_1} + e^{\alpha_2+\gamma_2} + e^{\alpha_1+\alpha_2+\alpha_R+\gamma_1+\gamma_2}}{1 + e^{\alpha_1+\alpha_R+\gamma_1} + e^{\alpha_2+\alpha_R+\gamma_2} + e^{\alpha_1+\alpha_2+\gamma_1+\gamma_3}} \quad (7)$$

In Exs. (5) to (7), $\beta_1$, $\beta_2$ and $\beta_3$ represent extrinsic LLRs output from network decoding unit 101. The thus obtained extrinsic LLRs of coded bits are input to decoding units 38-1, 38-2 and 38-3 via deinterleaving units 37-1, 37-2 and 37-3.

In decoding units 38-1, 38-2 and 38-3, the extrinsic LLRs $\gamma_1$, $\gamma_2$ and $\gamma_3$ of the coded bits obtained by error correction, are input to network decoding unit 101 via interleaving units 39-1, 39-2 and 39-3. The process heretofore is repeated an arbitrary number of times to thereby acquire decoded bits.

Similarly, even if there exist four or five mobile station apparatuses, it is possible to regard that coding is performed by serially concatenating the network coding with a coding rate of (N−1)/N (N: the number of mobile station apparatuses) and channel coding, it is hence possible to achieve iterative decoding.

Here, though network decoding is performed herein by regarding that the coding rate is increased without any alteration of modulation scheme, if the reception quality between the relay station apparatus and the base station apparatus is good and the relay station apparatus can be set with a high modulation level, it is possible by transmitting the signals from the mobile station apparatuses using QPSK (Quaternary Phase Shift Keying) and the signal from the relay station apparatus using 16QAM (Quadrature Amplitude Modulation) to relay coded bits for four mobile station apparatuses without reducing the coding rate in the network coding for the coded bits, it is hence possible to use this technique for modifying the modulation scheme and coding rate of error-correction coding.

4. The Fourth Embodiment

Figure 11:
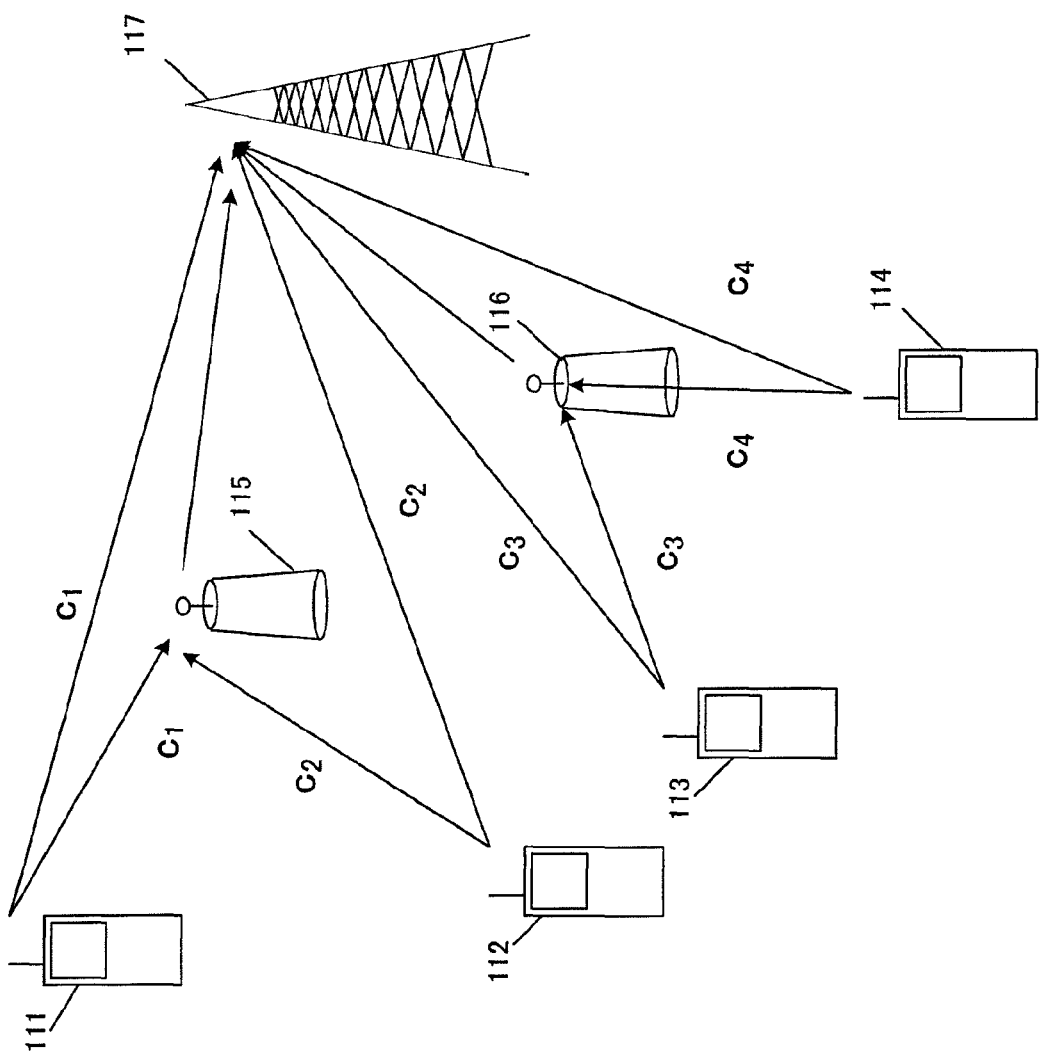
FIG. 11 A diagram showing the outline of a wireless communication system in the fourth embodiment.

Next, the fourth embodiment will be described. FIG. 11 shows a conceptual diagram of the embodiment. This diagram shows a case where four base station apparatuses and two relay station apparatus exist. A first mobile station apparatus 111 and second mobile station apparatus 112 are relayed to a base station apparatus 117 via a first relay station apparatus 115. Similarly, a third mobile station apparatus 113 and fourth mobile station apparatus 114 are relayed to base station apparatus 117 via a second relay station apparatus 116.

This is a system which includes multiple configurations of the first embodiment, and is effective when many relay station apparatuses are deployed. Here, if an odd number of mobile station apparatuses exist, the signals from two mobile station apparatuses are relayed by a single relay station apparatus on the basis of the first embodiment while the signals from the remaining three stations may be relayed based on the third embodiment. As a result, it is possible to realize a relaying system that makes use of relay station apparatuses in an efficient manner.

5. The Fifth Embodiment

Figure 12:
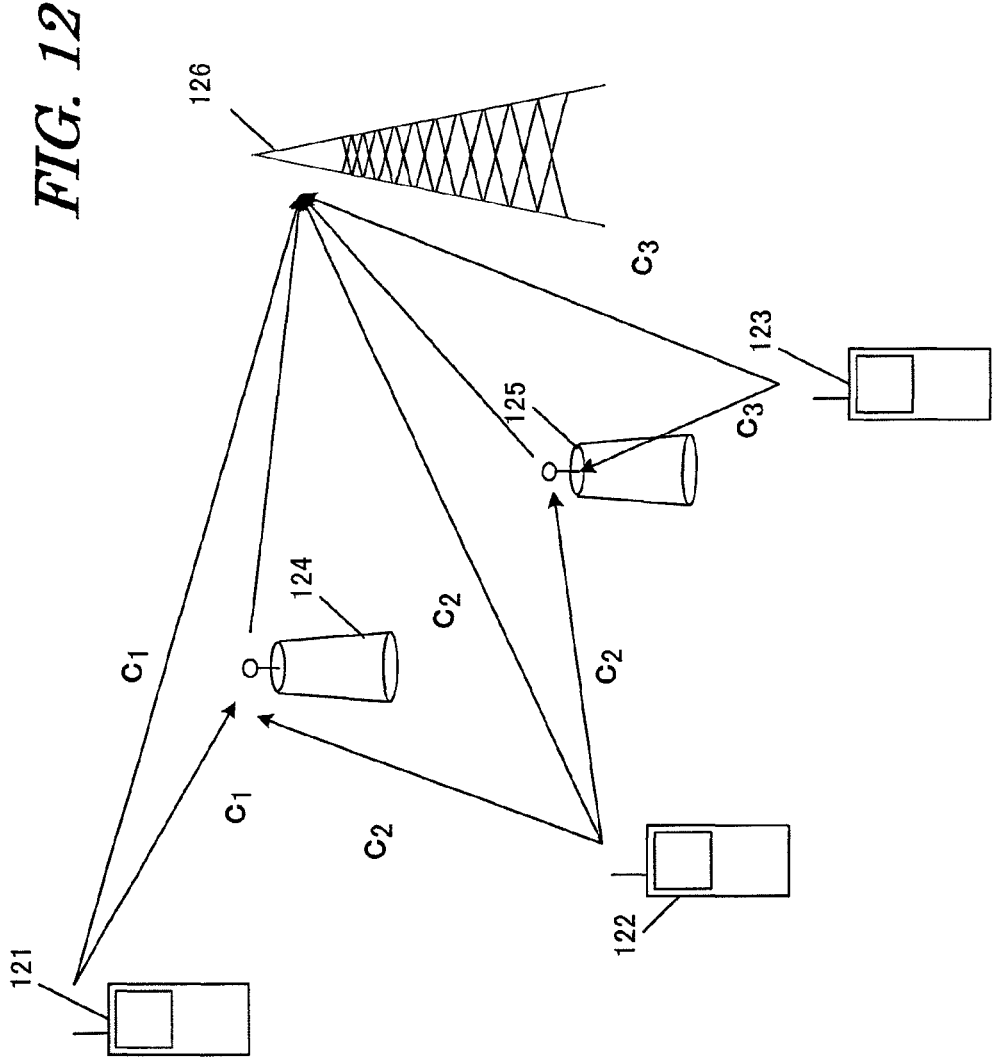
FIG. 12 A diagram showing a configuration of abase station apparatus in the fifth embodiment.

As the fifth embodiment, a configuration including three mobile station apparatuses and two relay station apparatuses will be described. FIG. 12 shows one example of this. This figure shows an example in which a first mobile station apparatus 121, second mobile station apparatus 122 and third mobile station apparatus 123 communicate with a base station apparatus 126 through a first relay station apparatus 124 and second relay station apparatus 125. Now, a case where the reception power at the base station apparatus 126 from second relay station 125 is lower than the reception power from other mobile station apparatuses will be considered. In this case, it is assumed that the signal of first mobile station apparatus 121 is relayed by first relay station apparatus 124 and the signal of third mobile station apparatus 123 is relayed by second relay station apparatus 125, whereas the signal of second mobile station apparatus 122 is relayed by use of both first and second relay station apparatuses 124 and 125, taking into account that the reception power level at base station apparatus 126 is low.

In this case, when the coded bits transmitted by mobile station apparatuses 121, 122 and 123 are denoted by $c_1$, $c_2$ and $c_3$, respectively, the network coded bits transmitted by relay station apparatuses 124 and 125 are given by the following Ex. (8) and Ex. (9), respectively.

[Math 5]

$$c_{R1} = c_1 \oplus c_2 \quad (8)$$

$$c_{R2} = c_2 \oplus c_3 \quad (9)$$

In Ex. (8) and Ex. (9), $c_{R1}$ represents network coded bits transmitted by first relay station apparatus 124 and $c_{R2}$ represents network coded bits transmitted by second relay station apparatus 125. In this case, it is of course possible to apply the signal multiplexing method shown in the second embodiment to each of relay station apparatuses in order to deal with a reception power level imbalance.

Figure 13:
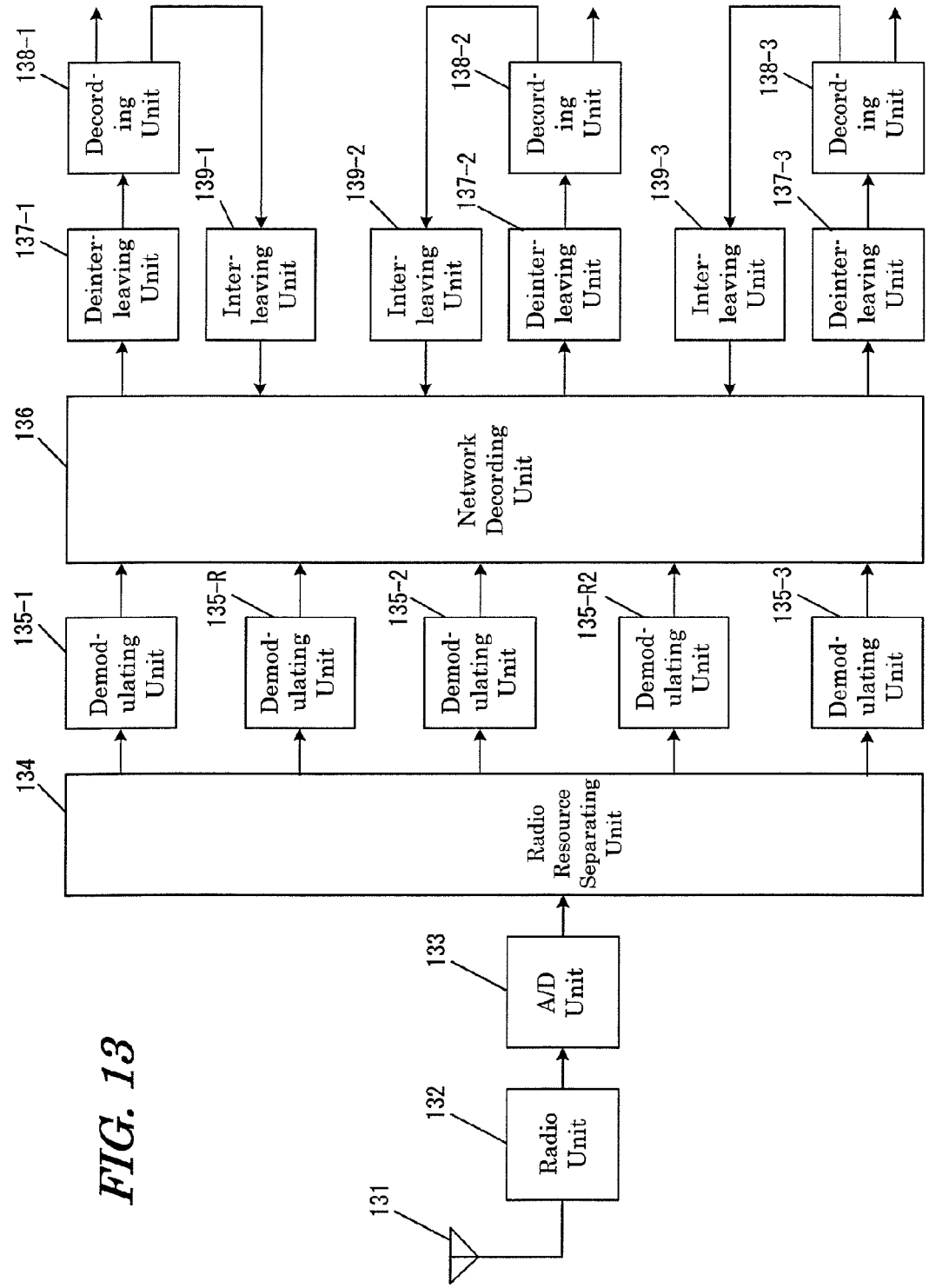
FIG. 13 A diagram showing a configuration of a base station apparatus in the fifth embodiment.

FIG. 13 shows one example of a base station apparatus as a receiving apparatus. The base station apparatus includes a receiving antenna 131, a radio unit 132, an A/D unit 133, a radio resource separating unit 134, demodulating units 135-1, 135-2, 135-3, 135-R and 135-R2, a network decoding unit 136, deinterleaving units 137-1, 137-2 and 137-3, decoding units 138-1, 138-2 and 138-3, and interleaving units 139-1, 139-2 and 139-3.

The received signals received at receiving antenna 131 are down-converted to the baseband by radio unit 132, and then converted into digital signals by means of A/D unit 133. The obtained received signals are separated by radio resource separating unit 134 into individual signals from the mobile station apparatuses and relay station apparatuses, based on the way the signals have been multiplexed in time, frequency and spatial domains. From the separated signals, extrinsic LLRs are calculated by demodulating units 135-1, 135-2, 135-3, 135-R and 135-R2.

Here, it is assumed that the received signals from individual mobile station apparatuses are processed through 135-1, 135-2 and 135-3 while the received signals from the relay station apparatuses are processed through 135-R and 135-R2.

In network decoding unit 136, extrinsic LLRs are each regarded as a code having a coding rate of ⅗ and subjected to MPA estimation using the extrinsic LLRs input from interleaving units 139-1, 139-2 and 139-3 as the apriori information so that extrinsic LLRs of the coded bits of each mobile station apparatus are output.

The extrinsic LLRs of the coded bits of each mobile station apparatus, calculated at network decoding unit 136, are given by Ex. (10) to Ex. (12) when the extrinsic LLRs input from demodulating units 135-1, 135-2, 135-3, 135-R and 135-R2 are denoted as $\alpha_1, \alpha_2, \alpha_3, \alpha_{R1}$ and $\alpha_{R2}$ and the extrinsic LLRs input from interleaving units 139-1, 139-2 and 139-3 are denoted as $\gamma_1, \gamma_2$ and $\gamma_3$.

[Math 6]

$$\beta_1 = \alpha_1 + \ln \frac{e^{\alpha_{R1}} + e^{\alpha_2 + \alpha_{R2} + \gamma_2} + e^{\alpha_3 + \alpha_{R1} + \alpha_{R2} + \gamma_3} + e^{\alpha_2 + \alpha_3 + \gamma_2 + \gamma_3}}{1 + e^{\alpha_3 + \alpha_{R2} + \gamma_3} + e^{\alpha_2 + \alpha_{R1} + \alpha_{R2} + \gamma_2} + e^{\alpha_2 + \alpha_3 + \alpha_{R1} + \gamma_2 + \gamma_3}} \quad (10)$$

$$\beta_2 = \alpha_2 + \ln \frac{e^{\alpha_{R1} + \alpha_{R2}} + e^{\alpha_3 + \alpha_{R1} + \gamma_3} + e^{\alpha_1 + \alpha_{R2} + \gamma_1} + e^{\alpha_3 + \alpha_{R1} + \alpha_{R2} + \gamma_3} + e^{\alpha_1 + \alpha_3 + \gamma_1 + \gamma_3}}{1 + e^{\alpha_3 + \alpha_{R1} + \gamma_3} + e^{\alpha_3 + \alpha_{R2} + \gamma_3} + e^{\alpha_2 + \alpha_{R1} + \alpha_{R2} + \gamma_2} + e^{\alpha_2 + \alpha_3 + \alpha_{R1} + \alpha_{R3} + \gamma_1 + \gamma_3}} \quad (11)$$

$$\beta_3 = \alpha_3 + \ln \frac{e^{\alpha_{R2}} + e^{\alpha_2 + \alpha_{R1} + \gamma_2} + e^{\alpha_1 + \alpha_{R1} + \alpha_{R2} + \gamma_1} + e^{\alpha_1 + \alpha_2 + \gamma_1 + \gamma_2}}{1 + e^{\alpha_1 + \alpha_{R1} + \gamma_1} + e^{\alpha_2 + \alpha_{R1} + \alpha_{R2} + \gamma_2} + e^{\alpha_1 + \alpha_2 + \alpha_{R2} + \gamma_1 + \gamma_2}} \quad (12)$$

Here, $\beta_1, \beta_2$ and $\beta_3$ are the output extrinsic LLRs. The obtained extrinsic LLRs are input to decoding units 138-1, 138-2 and 138-3 via deinterleaving units 137-1, 137-2 and 137-3.

In decoding units 138-1, 138-2 and 138-3, error correction by MAP estimation based on channel coding is performed so that extrinsic LLRs improved in likelihood are calculated, and the calculated result is once again input as the apriori information to network coding unit 136, via interleaving units 139-1, 139-2 and 139-3. Iterating the above process an arbitrary number of times makes it possible to obtain relay diversity effect thanks to cooperation. Though this case was explained with three mobile station apparatuses and two relay station apparatuses, this relaying method can be realized with any number of mobile station apparatuses and any number of relay station apparatuses.

6. The Sixth Embodiment

The sixth embodiment will be described referring a mode in which the present invention is applied to a MIMO technique. When the MIMO technique is applied to the uplink and a mobile station apparatus transmits signals to the base station apparatus, the user's hand hiding a particular transmitting antenna may cause an imbalance in reception power. Even under such a condition, it is possible to obtain good transmission characteristics by allotting the network code to a transmitting antenna whose reception power is the highest.

Figure 14:
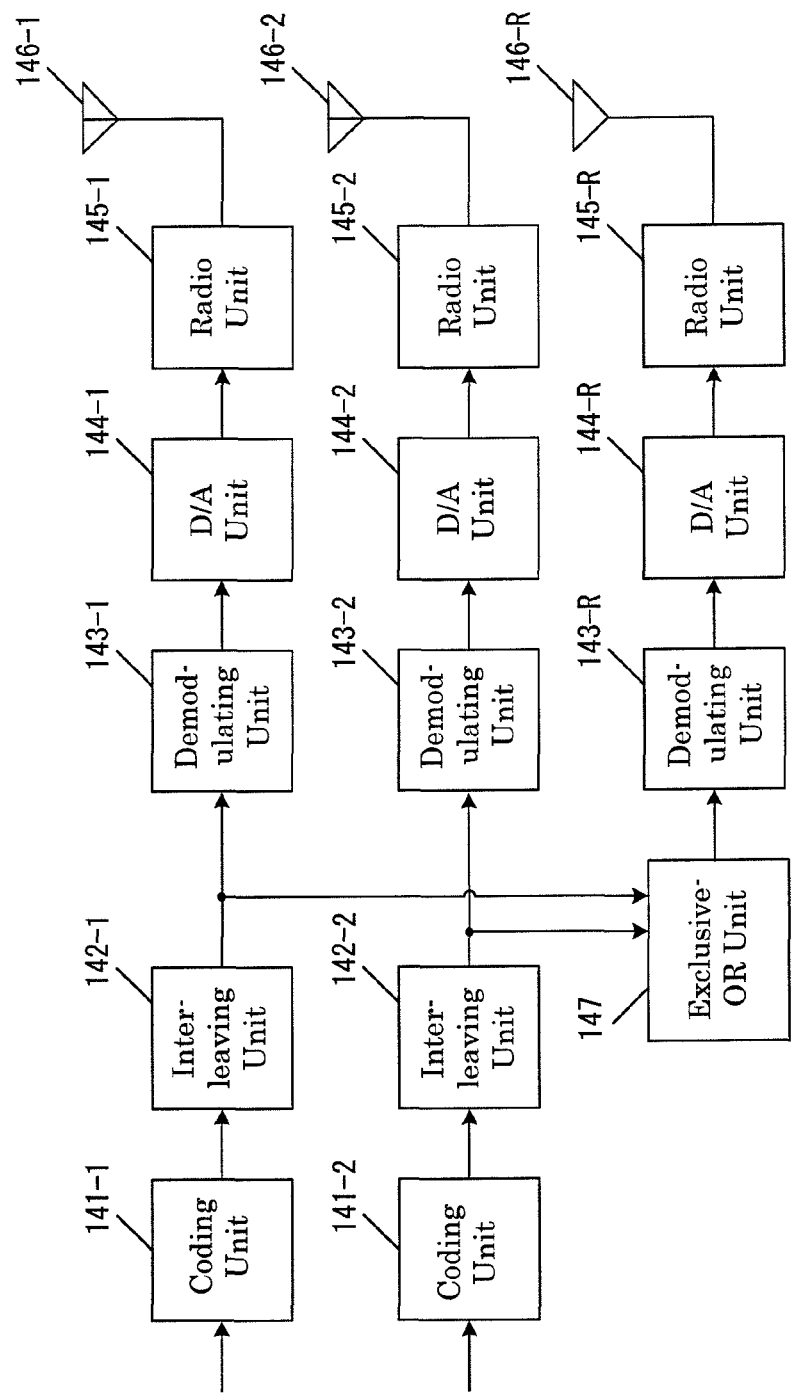
FIG. 14 A diagram showing a configuration of a mobile station apparatus in the sixth embodiment.

FIG. 14 shows one example of a mobile station apparatus (transmitter). Here, it is assumed that the mobile station apparatus is equipped with three transmitting antennas. The mobile station apparatus includes coding unit 141-1 and 141-2, interleaving units 142-1 and 142-2, modulating units 143-1, 143-2 and 143-R, D/A units 144-1, 144-2 and 144-R, radio units 145-1, 145-2 and 145-R and transmitting antennas 146-1, 146-2 and 146-R and an exclusive-OR unit 147.

Further, the number of code words in error correction coding is set at 2. In the blocks in the same figure, the blocks designated with * * *-1 perform the processing for the first code word, whereas the blocks designated with * * *-2 perform the processing for the second code word.

In coding units 141-1, 142-2, the information bits of each code word is error correction coded and rearranged in time order through interleaving units 142-1 and 142-2. Thereafter, the results are input to modulating units 143-1 and 143-2 and also input to exclusive-OR unit 147.

Network coded bits are calculated by XOR operation in exclusive-OR unit 147 and the result is input to modulating unit 143-R. Modulating units 143-1, 143-2 and 143-R generate modulation symbols from the input coded bits, and the symbols are converted into analog signals by D/A units 144-1, 144-2 and 144-R. The analog signals are up-converted to the radio frequency by radio units 145-1, 145-2 and 145-R, and transmitted from transmitting antennas 146-1, 146-2 and 146-R.

Though the basic constitutes of the transmitting apparatus is demonstrated herein, the actual configuration is selected so as to maximize the reception power level from transmitting antenna 146-R, on the basis of the concept of the first embodiment.

Figure 15:
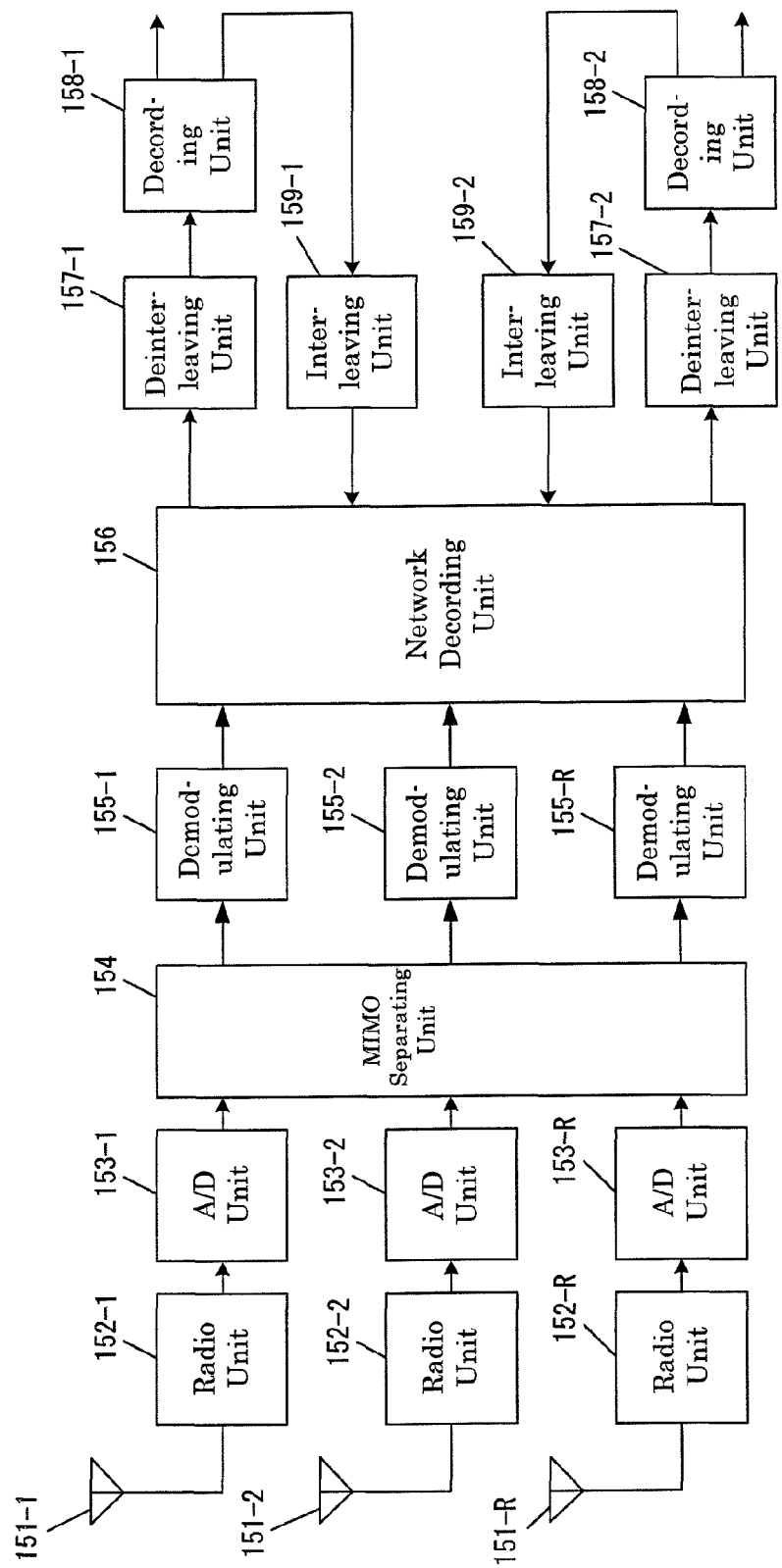
FIG. 15 A diagram showing a configuration of abase station apparatus in the sixth embodiment.
Figure 16:
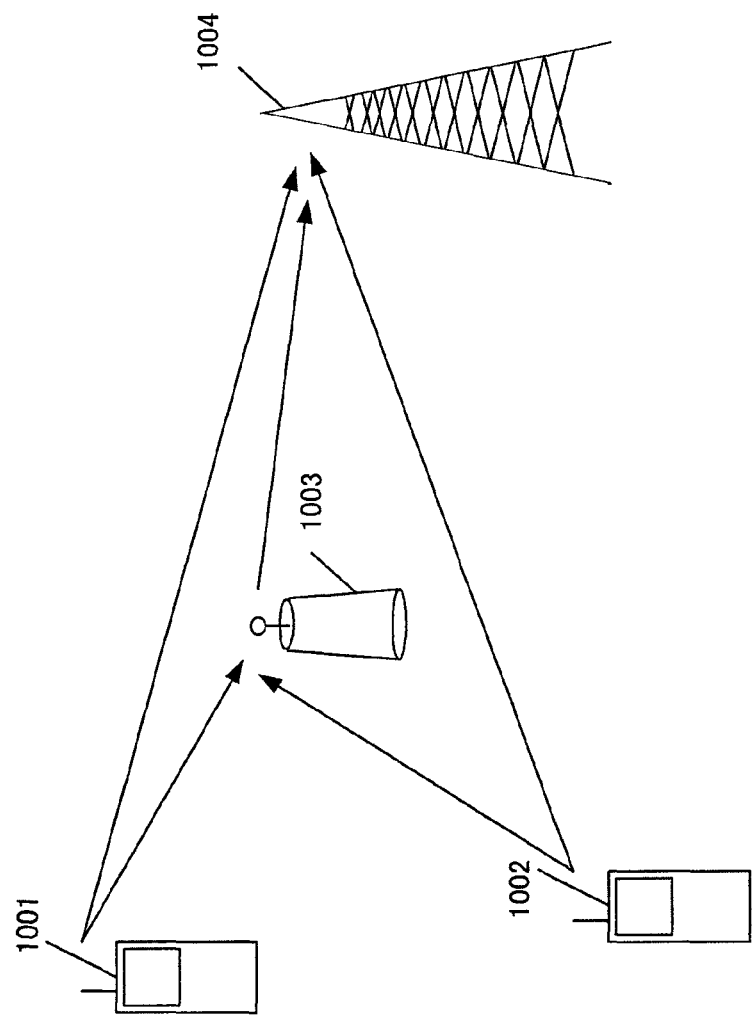
FIG. 16 A diagram for illustrating the outline of a wireless communication system.
Figure 17:
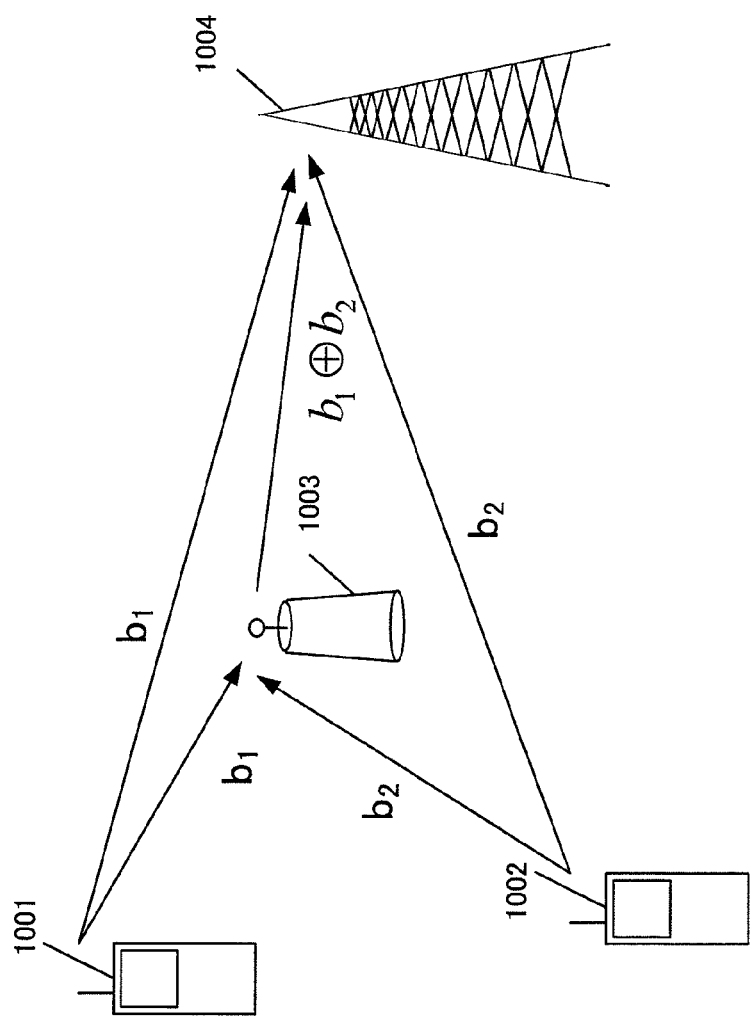
FIG. 17 A diagram for illustrating the outline of a wireless communication system.
Figure 18:
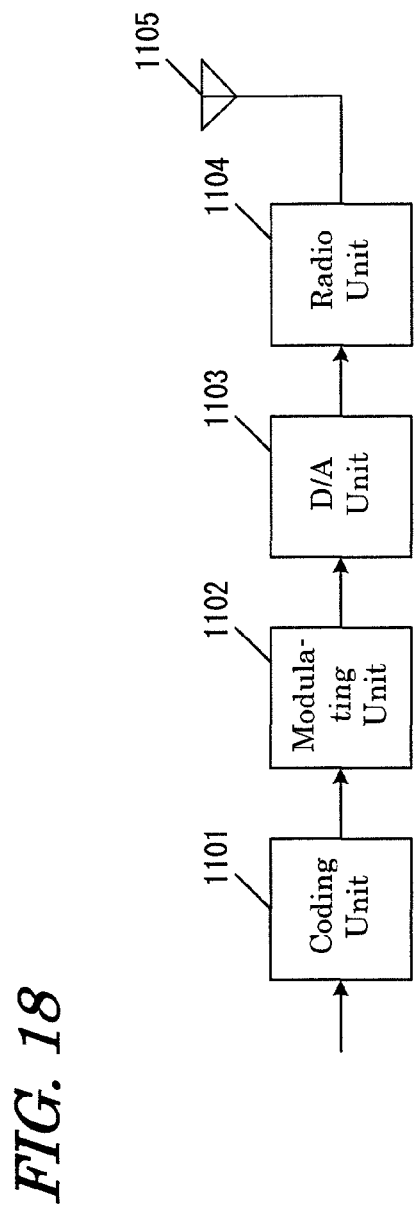
FIG. 18 A diagram for illustrating a configuration of a conventional mobile station apparatus.
Figure 19:
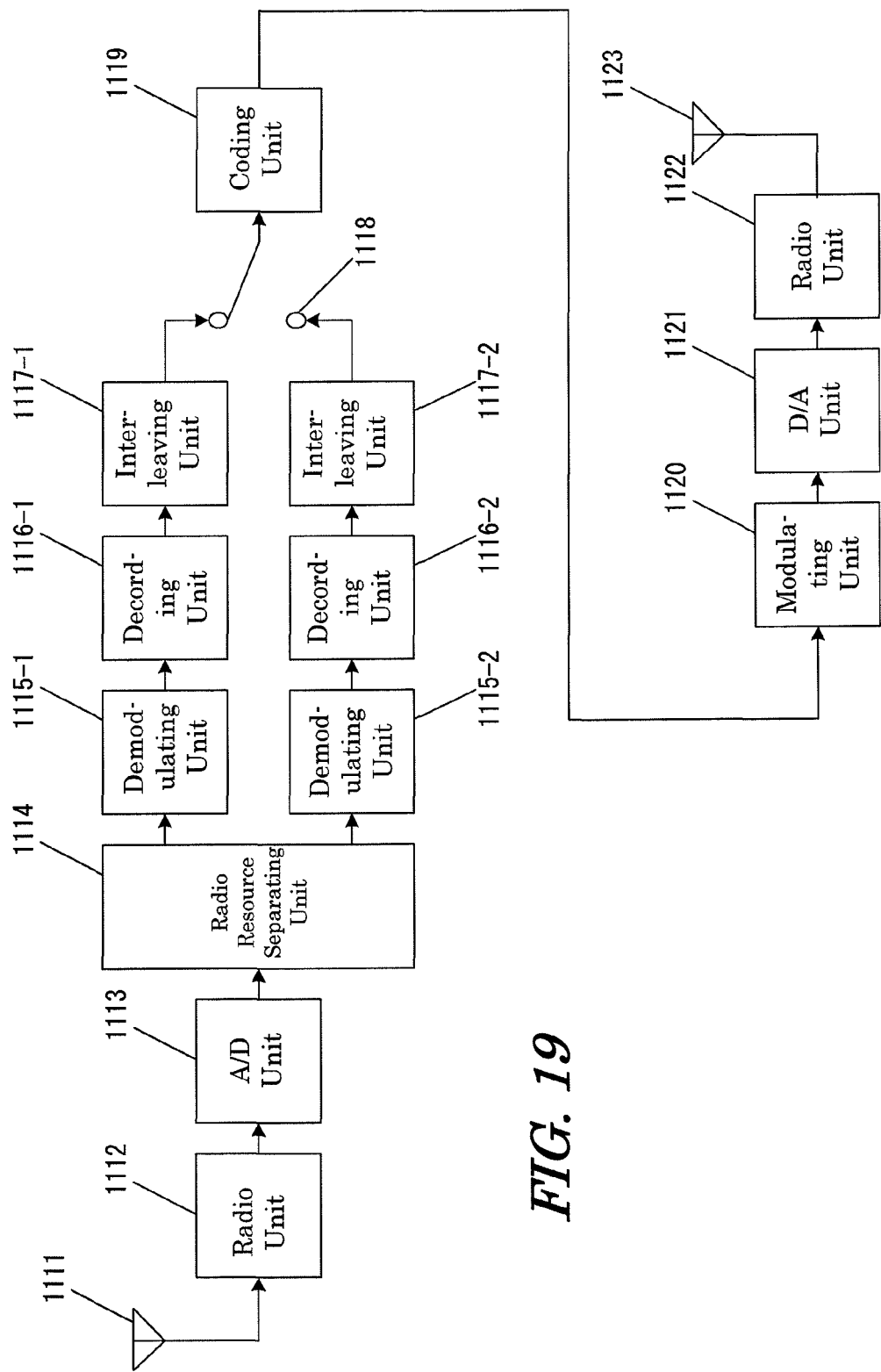
FIG. 19 A diagram for illustrating a configuration of a conventional relay station apparatus.
Figure 20:
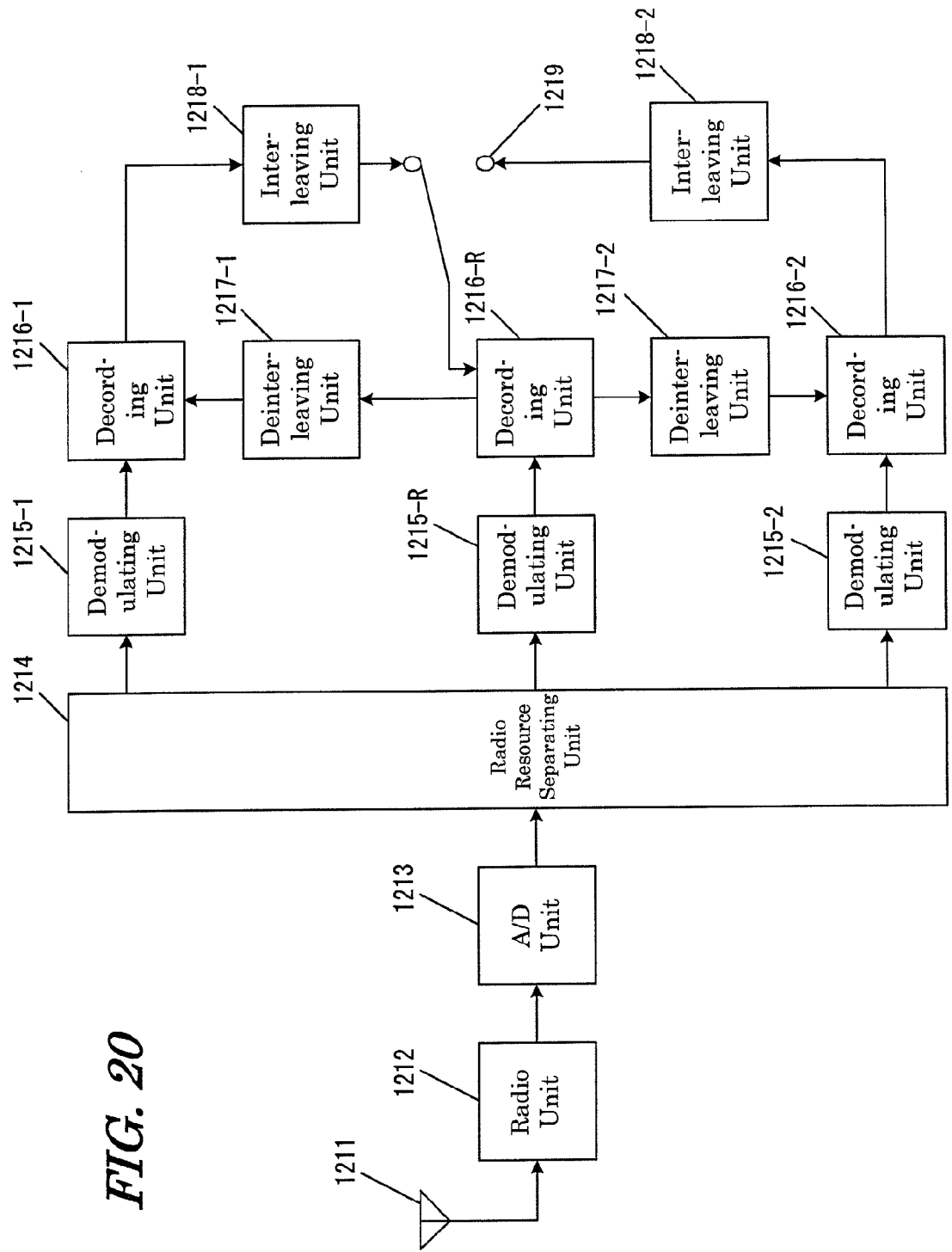
FIG. 20 A diagram for illustrating a configuration of a conventional base station apparatus.

FIG. 15 shows one example of the base station apparatus (receiving apparatus). The receiving apparatus includes receiving antennas 151-1, 151-2 and 151-R, radio units 152-1, 152-2 and 152-R, A/D units 153-1, 153-2 and 153-R, a MIMO separating unit 154, demodulating units 155-1, 155-2 and 155-R, a network decoding unit 156, deinterleaving units 157-1 and 157-2, decoding units 158-1 and 158-2 and interleaving units 159-1 and 159-2.

The received signals received at individual receiving antennas 151-1, 151-2 and 151-R are down-converted from the radio frequency to the baseband by radio units 152-1, 152-2 and 152-R, and then converted into digital signals by means of A/D units 153-1, 153-2 and 153-R. Thereafter, the digital signals are spatially separated by MIMO separating unit 154, and the resulting signals are given to demodulating units 155-1, 155-2 and 155-R, where extrinsic LLRs of the coded bits transmitted from each transmitting antenna are calculated. Here, the blocks allotted with * * *-1 perform the receiving process for the first code word, the blocks allotted with * * *-2 perform the receiving process for the second code word, and the blocks allotted with * * *-R perform the receiving process for the network code.

The extrinsic LLRs obtained from demodulating units 155-1, 155-2 and 155-R are network-decoded by network decoding unit 156 similarly to the base station apparatus of the first embodiment, and then are error correction decoded in decoding units 158-1 and 158-2 via deinterleaving units 157-1 and 157-2. The extrinsic LLRs improved by error correction are fed back to network decoding unit 156 via interleaving units 159-1 and 159-2 and decoded once again.

After repetition of the above process an arbitrary number of times, the posteriori LLRs of information bits are hard-decided at the final stage though not illustrated, so as to obtain decoded bits of the first and second code words. In this way, this scheme can be applicable in the above way in an environment in which there would occur an reception power imbalance. It goes without saying that not only the first embodiment but also the techniques of the second to fourth embodiments can be applied to the situation of the present embodiment.

As the embodiments of this invention has been detailed with reference to the drawings, the specific configuration should not be limited to the embodiments. Designs and others that do not depart from the gist of this invention should also be included in the scope of claims.

Description of Reference Numerals

| | |
|---|---|
| 1 | coding unit |
| 2 | interleaving unit |
| 3 | modulating unit |
| 4 | D/A unit |
| 5 | radio unit |
| 6 | transmitting antenna |
| 11 | receiving antenna |
| 12 | radio unit |
| 13 | A/D unit |
| 14 | radio resource separating unit |
| 15-1, 15-2 | demodulating unit |
| 16-1, 16-2 | deinterleaving unit |
| 17-1, 17-2 | decoding unit |
| 18-1, 18-2 | interleaving unit |
| 19 | exclusive-OR unit |
| 20 | modulating unit |
| 21 | D/A unit |
| 22 | radio unit |
| 23 | transmitting antenna |
| 31 | receiving antenna |
| 32 | radio unit |
| 33 | A/D unit |
| 34 | radio resource separating unit |
| 35-1, 35-2, 35-R | demodulating unit |
| 36 | network decoding unit |
| 37-1, 37-2, 37-3 | deinterleaving unit |
| 38-1, 38-2, 38-3 | decoding unit |
| 39-1, 39-2, 39-3 | interleaving unit |
| 51-1, 51-2, 53-1, 53-2 | adder |

-continued

Description of Reference Numerals

| | |
|---|---|
| 52-1, 52-2 | box adder |
| 61, 62, 91, 92, 93, 111, 112, 113, 114, 121, 122, 123 | mobile station apparatus |
| 63, 94, 115, 116, 124, 125 | relay station apparatus |
| 64, 95, 117, 126 | base station apparatus |
| 71 | exclusive-OR unit |
| 81-1, 81-2, 81-R | reception quality measuring unit |
| 82 | LUT |
| 101 | network decoding unit |

The invention claimed is:

1. A wireless communication system including:
a plurality of mobile station apparatuses that transmit coded bits obtained by applying error-correction coding to information bits;
a relay station apparatus that receives coded bits from the plural mobile station apparatuses, applies network coding on the coded bits and transmits the network-coded bits; and
a base station apparatus that receives and decodes the coded bits transmitted from the plural mobile station apparatuses and the network-coded bits transmitted by the relay station apparatus, characterized in that
the base station apparatus, when decoding the received coded bits, performs iterative decoding by regarding the received coded bits as coded bits obtained by serially concatenated coding of the error correction coding and the network coding, and
wherein the relay station apparatus controls a ratio of coded bits to be multiplexed by network coding, in accordance with reception power levels at which the coded bits from the mobile station apparatuses reach the base station apparatus.

2. The wireless communication system according to claim 1, wherein the network coding is realized by exclusive-OR operation in the relay station apparatus.

3. The wireless communication system according to claim 1, wherein the mobile station apparatus includes a plurality of transmitting antennas while the base station apparatus includes a plurality of receiving antennas, and network-coded bits are assigned to, at least, one of the transmitting antennas, and transmitted therefrom.

4. A communication method in a wireless communication system including:
transmitting, by a plurality of mobile station apparatuses, coded bits obtained by applying error-correction coding to information bits;
in a relay station apparatus, receiving coded bits from the plural mobile station apparatuses, applying network coding on the coded bits and transmitting the network-coded bits;
in a base station apparatus, receiving and decoding the coded bits transmitted from the multiple mobile station apparatuses and the network-coded bits transmitted by the relay station apparatus; and
controlling, by the relay station apparatus, a ratio of coded bits to be multiplexed by the network coding, in accordance with reception power levels at which the coded bits from the mobile station apparatuses reach the base station apparatus, wherein
when decoding the received coded bits at the base station apparatus, performing iterative decoding by regarding the received coded bits as coded bits obtained by serially concatenated coding of the error correction coding and the network coding.

5. A relay station apparatus that communicates with a base station apparatus, comprising:
- a receiving unit that receives coded bits from plural mobile station apparatuses;
- a transmitting unit that applies network coding to the coded bits received and transmits the network-coded bits; and
- a control unit that controls a ratio of the coded bits to be multiplexed by the network coding in accordance with reception power levels of the coded bits from the mobile station apparatuses.

\* \* \* \* \*